United States Patent [19]
Pogue, Jr.

[11] Patent Number: 5,995,512
[45] Date of Patent: Nov. 30, 1999

[54] HIGH SPEED MULTIMEDIA DATA NETWORK

[75] Inventor: Russell Wilbur Pogue, Jr., Greentown, Ind.

[73] Assignee: Delco Electronics Corporation, Kokomo, Ind.

[21] Appl. No.: 08/785,244

[22] Filed: Jan. 17, 1997

[51] Int. Cl.[6] .................................................. H04L 12/56
[52] U.S. Cl. ........................ 370/419; 370/420; 370/508
[58] Field of Search .................................. 370/395, 400, 370/401, 463, 465, 466, 519, 407, 420, 421, 446, 252, 508, 424, 425, 426, 419; 359/118

[56] References Cited

U.S. PATENT DOCUMENTS

| | | | |
|---|---|---|---|
| 4,872,157 | 10/1989 | Hemmady et al. | 370/400 |
| 5,001,642 | 3/1991 | Botzenhardt et al. | 364/431.12 |
| 5,274,635 | 12/1993 | Rahman et al. | 370/352 |
| 5,420,858 | 5/1995 | Marshall et al. | 370/352 |
| 5,570,368 | 10/1996 | Murakami et al. | 370/395 |
| 5,581,549 | 12/1996 | Mochinaga | 370/395 |
| 5,600,469 | 2/1997 | Yamazaki | 370/395 |

OTHER PUBLICATIONS

Paul Sferrazza, Rick Halter, John Stark, Architecture and Operation of the HIP7010 J1850 Byte–Level Interface Circuit, SAE Technical Paper Series, Feb. 1995, pp. 25–42.

Michael Riley, Raymond Moyer, "J1850 Compatible Node Development," SAE Technical Paper Series, Feb. 1996, pp. 45–55.

*Primary Examiner*—Chau Nguyen
*Assistant Examiner*—Soon-Dong Hyun
*Attorney, Agent, or Firm*—Jimmy L. Funke

[57] ABSTRACT

A low cost, high speed multimedia data network is disclosed. The network preferably includes a fiber optic data bus arranged in a star topology configuration. Various types of devices or nodes may be placed in communication with the bus via a specially designed interface. The interface allows a device to communicate with the high speed network without requiring that the device have the processing power to receive and transmit data according to the protocols and demands of the network. The interface may be configured to match the complexity of its associated device. For intelligent devices, the interface may allow some of the network-related functions to be performed by the device itself. For non-intelligent (or "dumb") devices, the interface performs substantially all of the network-related functions. In general, the interface provides the capability of insulating a node from the complexities of the high speed network by receiving data from and providing data to the node according to the node's data format, and receiving data from and providing data to the network according to the network's data format. The general messaging protocols are designed to facilitate the transfer of data in a star topology configuration, while also facilitating the relatively low cost and flexible implementation of the network.

19 Claims, 15 Drawing Sheets

HIGH SPEED MULTIMEDIA DATA NETWORK

BACKGROUND OF THE INVENTION

The present invention relates in general to high speed communications networks. More particularly, it relates to a fiber optic high speed data network capable of transmitting audio, video, data, low-bandwidth control data, and other similar signals.

There is often a need to transmit information between devices that are physically remote from each other. For example, in some passenger vehicles, non-critical multimedia information, such as video, audio, data, low-bandwidth control data, and other similar signals, must be transmitted between remote devices such as a compact disk player, a control panel, an audio amplifier/processor and loudspeakers. One way of connecting such devices is to provide dedicated point-to-point electrical connections. Dedicated connections, however, can quickly become unmanageable as the number of devices that need to be in communication increases.

For applications that require high speed communications between several remote devices, a communications network can provide a cost effective data transmission medium. The basic function of data communications networks is to make it possible for geographically remote pieces of equipment to communicate with each other simply by connecting with the network. The tasks that must be performed in order to effectively carry out data transmissions in a network are best organized by dividing the required tasks into a sequence of more elementary functions that are organized in some fashion. The precise definition and structure of this aggregate set of functions is called a network architecture. Typically, network architectures follow a linearly hierarchial model in which the functions are organized into a linear succession of so-called "layers". For example, the International Standardization Organization (ISO) has proposed a 7-layered model architecture consisting of a physical layer, a data link layer, a network layer, a transport layer, a session layer, a presentation layer, and an application layer. The physical layer, which is the lowest level of the hierarchy, is concerned primarily with the transparent transmission of a bit stream (regardless of its meaning) across physical communication resources. In local networks, the physical medium may be a twisted pair, a coaxial cable, an optical fiber, or radio.

SUMMARY OF THE INVENTION

The present invention provides a novel implementation for the physical layer and associated data transmission and control protocols of a data communications network. More particularly, the present invention provides a physical network design and data transmission and control protocol that allows a high-speed local area network to be implemented in a simple, reliable, efficient, flexible and low-cost manner.

The equipment or nodes that communicate via a network are often different devices that each have different levels of signal processing capabilities and requirements. According to the methods and devices of the present invention, a variety of node types having a variety of signal processing capabilities and requirements can be placed in communication via the network without having to add processing power to the existing node electronics in order to allow the node to communicate with the network. Accordingly, no costs need to be added to the node electronics in order to allow the node to communicate via the network. This is accomplished by, inter alia, providing an intelligent interface unit between the node and the network's data bus. The interface unit, in the case of a high speed fiber optic implementation, includes connections for coupling to the optical fiber data bus of the network, connections for coupling to the input and output ports of the node, transducers for converting received optical pulses to electrical signals and vice versa, and an interface circuit. The interface circuit, along with its associated protocols, provides the interface unit with sufficient flexibility to allow the same unit to interact with both "intelligent" and "dumb" nodes. Intelligent nodes generally have some level of microprocessing power that can be made available for controlling some aspect of the node's interaction with the network data bus, while a dumb node would generally have either no processing power or no available processing power. Preferably, the interface circuit can be configured to recognize whether its associated node is intelligent or dumb, transfer some portion of the data bus control functions to the node if the node is intelligent, and maintain substantially all of the data bus controls within the interface unit (or some other portion of the network data bus) if the node is determined to be dumb. Accordingly, the interface circuit has the ability to isolate the node completely or partially from dealing with the complexities of interacting with a high speed data bus by providing circuitry that is capable of handling the protocols of the network, transferring some of those protocol-related functions to the node if appropriate, while at the same time providing data in a format/rate that is acceptable for that particular node. Some of the network-related complexities that may be assigned to the interface electronics include data structure and organization information, the transmit/receive slot assigned to that node, node clock synchronization, node clock frequency and phase recovery, other slot allocations, and other tasks that must be performed in order to accurately receive or transmit data at high speeds on the network.

Because the interface circuitry isolates the electronics that are already present on the node from the details of the network's high speed bus, the present invention alleviates the burden (and extra cost) that would otherwise have to be placed on the node electronics in order to reside in the high speed network. For example, a typical node for an automotive application would be a small display or switch pad having a low-end $1 microprocessor that is sufficient for carrying out that node's processing tasks. In order to communicate with a high speed data bus, the node electronics would ordinarily need to be able to receive and process data that is coming by at an extremely high rate, for example 100 Mbs, and that is in a protocol or format that may be relatively complex for the node electronics to process. ordinarily, this would require upgrading the node electronics to include a more expensive (e.g., $10) microprocessor that would allow the node to handle the complexity of communicating with the high speed data bus of the network. The need to upgrade the node electronics is eliminated in the present invention by providing a dedicated yet flexible interface circuit that is capable of executing the major node communication tasks if the node does not already have capacity for performing these tasks. The portion of the interface that communicates with the network data bus has the processing capacity to communicate with the network according to the network's format, while the portion of the interface that communicates with the node outputs and receives data having the general data characteristics that are compatible with the node. For added flexibility, each interface is provided with the capability of outputting data to its associated node in one of several predetermined formats that are chosen by setting designated memory registers in the interface.

The interface circuit, along with the messaging and control protocols of the network's physical layer, is designed to be capable of handling high speed data, yet simple enough to be implemented as a relatively low-cost component. For example, the interface electronics performs many network-related communications functions such as establishing a local clock for the node, correcting for frequency and phase differences between the local clock and activity occurring at another reference point on the network, and facilitating the transfer of data between the node device and the network.

Preferably, the interface electronics are implemented as a single integrated circuit (IC). As shown in FIGS. 2 and 3, the communication ports between the IC 64 and the node 70 can include, for example, a +V port connected to a node power conditioning section 72, an on/off port also connected to the node power conditioning section 72, an IIC (inter IC control) port connected to the node controller 74, an IC clock port connected to the node digital processing section 76, and an IIS (inter IC signal) port also connected to the node digital processing section 76. In general, the +V connection provides power connections, the on/off port provides optional power moding functions, the IIC is a control interface that provides fairly low bandwidth (up to about 1 Mb/sec) control signals, the IC clocks are synchronized to the network 30 and are used for processing the data and/or a local reference to the node, and the IIS port, which could go up to speeds of several Mbs, is for transferring data to and from the node. The IC interface ports shown in FIGS. 2 and 3 are only examples of possible node data formats, and other formats are equally possible. The intent is to provide the IC with enough flexibility that the format of the data that the IC is capable of receiving from and sending to the node can be configured to provide a natural interface with the node. The disclosed IIC and IIS ports are well known formats for digital audio. Other known interfaces could include, for example, an SPI (serial peripheral interface) protocol which is a serial interface protocol appropriate for video data. Additionally, parallel interface ports could also be provided.

As an example, suppose one were connecting to the network of the present invention a remote CD player and an audio processor/amplifier. At the CD player, the IC port of the IC that interfaces with the CD player could be configured as an IIS input that receives audio data at the appropriate IIS data rate from the CD player. At the audio processor, the IC port of the IC that interfaces with the audio processor could be configured as an IIS output that transmits audio data at the appropriate IIS data rate to the audio processor. Both of the ICs would interface with the network data bus at the network data rate, which is presumably high speed, while at the same time interfacing with the CD player and audio processor at the IIS data rate which is readable by the CD player and the audio processor. The IC could be provided with a variety of ports that could be configured for other communication rates. Accordingly, the network behaves like a virtual IIS port to the CD player and audio processor.

The interface circuit and data transmission and control protocols of the present invention are preferably implemented as part of a fiber optic data bus arranged in a star topology. The star topology is particularly advantageous for high speed, non-critical video, audio, and low-bandwidth control data transmissions in a vehicular application. In an exemplary star topology (shown in FIG. 1), the high speed data bus includes a plurality of transmit and receive cables connected from the nodes to a central hub 32. The data transmissions according to the present invention are uniquely structured and organized to facilitate high speed transmission in a star topology configuration. The data on the network is divided into frames, and each node on the network is allowed to transmit data during some portion (or time slot) of the frame. The data transmissions from the various nodes are essentially multiplexed together to form a continuous stream of data on the network. Data transmitted from a node passes through the central hub 32 and is provided to all of the nodes on the network. According to the present invention, the nodes are provided with configuration information, via the IC interface unit, that lets each node know various information about the data structure, including the time slots in which each node should look for the data that is addressed to it.

A master controller on the network is assigned a special time slot within each frame of data. Preferably, the master controller occupies one of the node positions and, like the other nodes, communicates with the network via an interface IC. The master controller transmits various information in its time slot that allows the nodes to function properly within the network. For example, the master controller transmits the configuration information described above, along with timing data that is part of the information used by the interface units to synchronize their local clocks. The timing data sent by the master controller includes a SYNCH symbol that is part of a unique sequence that is used as the frequency reference for the entire rest of the system. The timing data received at each node from the master controller gets all node clocks very close to each other. Accordingly, all time synchronizations for all transmissions are derived from a common time base, and are made with respect to a common reference. Preferably, the common time base is provided by the master controller and the common reference is provided by the hub 32 of the star topology configuration.

In correcting for phase errors, the interface IC addresses the problems associated with propagation delays caused by the time that it takes for signals to travel along the data bus transmission medium. In the preferred embodiment of the present invention, the data bus transmission medium is a fiber optic data bus arranged in a star topology. Although propagation delays are ordinarily small for optical cable lengths in the range of 1–10 meters, at high frequencies the delay may become significant enough to cause data transmission errors. Also, different lengths of cable cause different propagation delays. The likelihood of a data collision increases unless these timing problems are compensated for. The present invention corrects this timing problem by providing a relatively simple IC circuit configuration that corrects phase differences between the local clock at the node and activity occurring at the central hub of the star topology configuration. The IC circuit configuration establishes a local clock frequency at each node (via information provided by the master controller), and uses another point on the network as a reference to further synchronize the local clock phase. The circuit basically observes its own transmission at the hub, and advances its transmissions by an appropriate amount so that proper alignment is observed at the hub.

In addition to compensating for propagation delays, the present invention provides further timing compensations at the receive end of the transmission. This procedure addresses any residual errors that were not eliminated by the transmitter sending its signal early. Each node transmits a special SOT (start-of-transmission) symbol at the beginning of its time slot. The SOT is comprised of two parts—a guard interval, and an alignment pattern. The guard interval provides a window of time that defines the amount of error that can be tolerated, and the alignment pattern provides a marker for actually measuring the error so that it can be compensated for at the receiver. The receiver receives the alignment pattern and identifies any deviation from the alignment pattern's nominal position. This deviation represents an error, and the receiver can compensate for that error because it now knows the magnitude and direction of the error.

Accordingly, all nodes on the network are synchronized to one specific timing pattern (the alignment pattern) that is provided to the nodes by one specific node (master node). All of the nodes use the alignment pattern as a frequency and phase reference. This allows a more precise frequency and phase alignment for the entire network because everything is referenced to the same clock source. At the same time, a certain amount of imprecision is accommodated because the disclosed interface allows a certain window of tolerance which relaxes the requirements of the local clocks at each node.

According to the appended claims, one embodiment of the present invention is a communications interface unit having a data interface in communication with a node interface port, a receiver in communication with the data interface and a network data bus, and a transmitter in communication with the data interface and the network data bus. The data interface receives data from the receiver according to a network data format, and provides data received from the receiver to an external node via the interface port according to a node data format compatible with that node. The data interface further receives data from the external node via the interface port according to the node data format, and provides the data received from the external node to the transmitter according to the network data format.

In another embodiment, the invention includes a communications interface having a data interface, a transmitter and a receiver. The data interface is in communication with a node interface port, and the receiver is in communication with the data interface and a first transducer. The first transducer receives light pulses from an optical fiber transmission line of an optical data bus, converts the received light pulses into digital data, and provides the digital data to the receiver. The transmitter is in communication with the data interface and a second transducer that receives digital data from the transmitter, converts the digital data received from the transmitter into light pulses, and provides the light pulses to another optical fiber transmission line of the optical data bus. The data interface receives digital data from the receiver according to a network data format, and provides data received from the receiver to an external node according to a node data format compatible with that node. The data interface further receives data from the external node according to the node data format and provides the data received from the external node to the transmitter according to the network data format. The apparatus further includes a controller in communication with the data interface, receiver and transmitter. The controller controls the data interface to determine the node data format.

In another embodiment, the invention includes a data communications system comprising a data communications network, a plurality of nodes, and configurable communications interfaces. The data communications network transmits data according to a network data format, and any one of the plurality of nodes transmits and/or receives data according to a node data format used by one of the plurality of nodes. The configurable communications interfaces are in communication with the network and the plurality of nodes, with the communications interfaces passing data from the nodes to the network, or from the network to the nodes. Each of the configurable communications interfaces is capable of being configured to accept data from its associated node in the node data format of its associated node, transmit data to the network in the network data format, receive data from the network in the network data format, and transmit data to its associated node in the node data format of its associated node.

By embedding the complexity of the high speed network in a relatively low-cost and flexible interface, the present invention avoids having to increase the cost of a node in order for that node to reside in the network. The cost of the interface is kept to a minimum by designing a simple data protocol and hardware that can be implemented in a single IC. The IC is made faster by focusing its components on hardware, and that hardware is made simple by its novel design. The needed flexibility is added by allowing the IC to be configured via software commands over the network from a master controller. Also, the data formats, network timing and transmission protocols of the present invention, allows the memory requirements for the interface IC to be kept to a minimum. The fact that the data is multiplexed into a stream data format such that the data comes and goes at a known and steady rate, allows for a minimum amount of data buffering in transferring data between the network bus and the node electronics.

The invention itself, together with further objects and attendant advantages, will best be understood by reference to the following detailed description, taken in conjunction with the accompanying drawings.

DETAILED DESCRIPTION OF THE DRAWINGS

Figure 1:
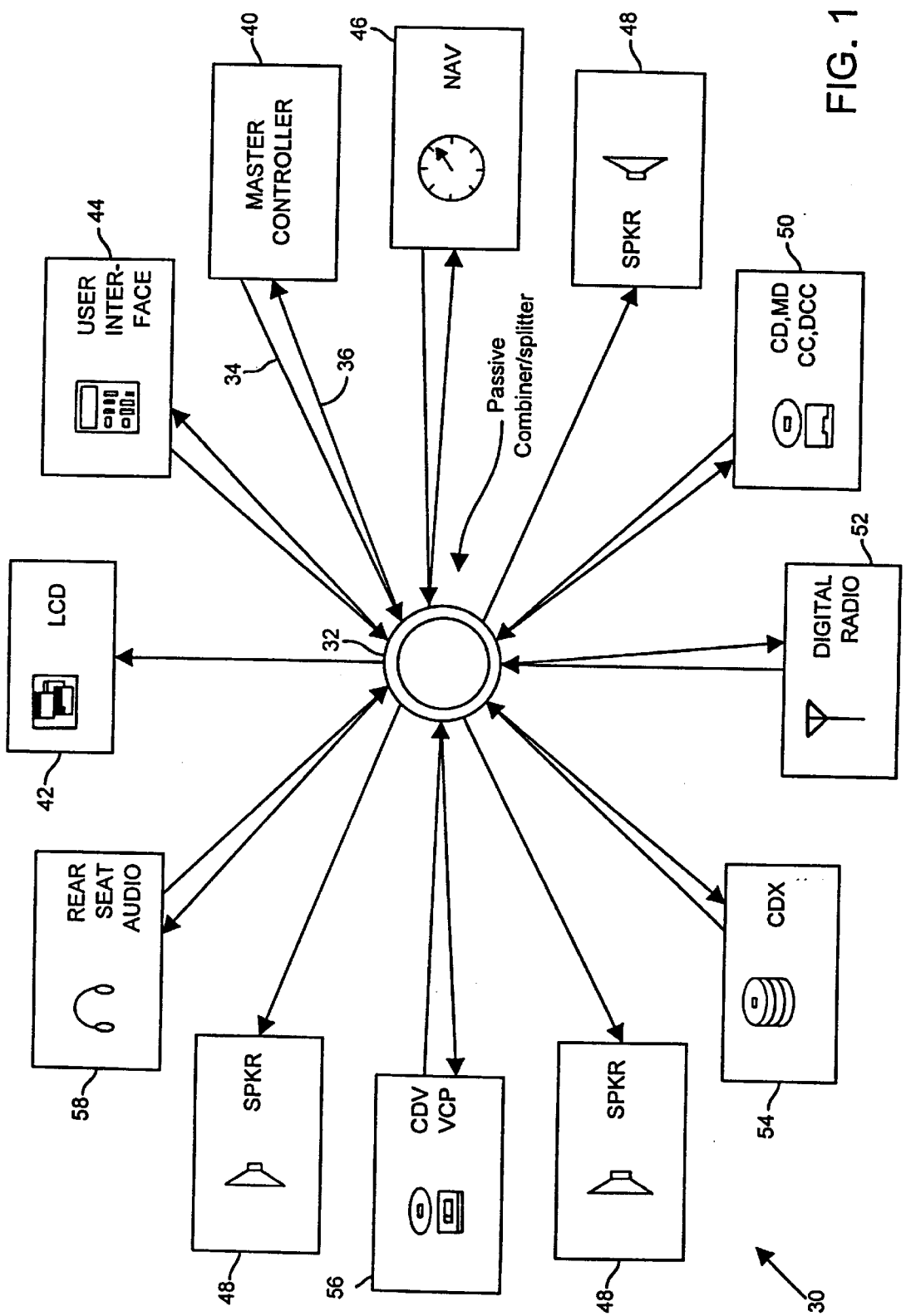
FIG. 1 illustrates a fiber optics communication network arranged in a passive star topology. The network may be utilized in implementing the present invention.

FIG. 1 illustrates an example of a high speed data network 30 capable of implementing the present invention. The data network 30 finds advantageous application in the high-speed transmission of non-critical multimedia and related communications, for example, video, audio, data, low-bandwidth control data, and other similar signals. The network 30 may be implemented in a variety of environments that require electronic communications between or among different pieces of equipment. The preferred operating environment is a transportation vehicle such as a car, van, truck, bus, train or airplane. Other operating environments are also applicable, such as a home, apartment building or office.

The network 30 provides a "virtual" communication path between any piece of equipment connected to the network and any other piece of equipment connected to the network. Accordingly, the basic function of the network is to make it possible for geographically remote pieces of equipment to communicate with each other simply by connecting with the network. The tasks that must be performed in order to effectively carry out communication transmissions in a network can be accomplished by dividing the tasks into a sequence of more elementary functions that are organized in some fashion. The precise definition and structure of this aggregate set of functions is called a network architecture. Typically, network architectures follow a linearly hierarchial model in which the functions are organized into a linear succession of so-called "layers". For example, the International Standardization Organization (ISO) has proposed a 7-layered model architecture consisting of a physical layer, a data link layer, a network layer, a transport layer, a session layer, a presentation layer, and an application layer. The physical layer, which is the lowest level of the hierarchy, is concerned primarily with the transparent transmission of a bit stream (regardless of its meaning) across physical communication resources. In local networks, the physical medium may be a twisted pair, a coaxial cable, an optical fiber, or radio.

The present invention is concerned primarily with high-speed, efficient, flexible and inexpensive transmission of data across the physical communication resources of the network 30, regardless of whether the data is audio, video, low-bandwidth control data, or other similar signals. Preferably, the network's communication medium is optical fibers arranged in a star topology as shown in FIG. 1. For high-speed communications between many locations or nodes in a vehicle, an optical fiber transmission medium arranged in a star topology is less expensive and less complicated than dedicated point-to-point connections or a hard-wired electrical network.

According to the present invention, the fiber optic network 30 includes hardware designs and data transmission protocols that allow the network to be implemented in a simple, inexpensive, flexible and reliable manner. For example, the data transmissions are uniquely structured and organized to facilitate high speed transmission in a star topology configuration. The data on the network is divided into frames (shown in FIGS. 4–8), and each node on the network 30 is allowed to transmit data during some portion (or time slot) of the frame. The data transmissions from the various nodes (reference nos. 40–58 shown in FIG. 1) are essentially multiplexed together to form a continuous stream of data on the network 30. Data transmitted from a node passes through a central hub 32 and is provided to all of the nodes on the network 30. According to the present invention, the nodes are provided with configuration information, via an interface unit (reference no. 64 shown in FIGS. 2 and 3), that lets each node know various information about the data structure, including the time slots in which each node should look for the data that is addressed to it.

A master controller 40 on the network 30 is assigned a special time slot within each frame of data. The master controller 40 transmits various information in its time slot that allows the nodes to function properly within the network. For example, the master controller 40 transmits the configuration information described above, along with timing data that is part of the information used by the interface units 64 to synchronize their local clocks. All time synchronizations for all transmissions are derived from a common time base, and are made with respect to a common reference. Preferably, the common time base is provided by the master controller 40 and the common reference is provided by the central hub 32.

A key feature of the network 30 is that the interface (shown at 62, 64 in FIGS. 2 and 3) can handle virtually all of the tasks associated with communicating via the high speed network 30, thereby allowing a node having little or no available processing capacity to be placed in communication with the network 30 without requiring that expensive additional processing power be added to the node. The interface 62, 64 mechanically, optically and electronically connects a given piece of equipment or node to the network 30. Each interface includes electronic circuitry, preferably implemented as an integrated circuit 64 that receives high-speed optical data from the network 30 in a format that is compatible with the network 30. The circuitry converts received optical data into electrical signals, provides converted electrical signals to an associated node in a format that is compatible with the node, receives electrical signals from an associated node in a format that is compatible with the node, converts the received electrical signals into optical signals, and places the converted optical signals on the network 30 in a format that is compatible with the network 30. The simple and inexpensive design of the electronic circuitry, along with associated data transmission protocols and compositions, allows a single interface to be flexible enough to handle high-speed data communications with the network or a relatively complex node, or low-speed data communications with a relatively simple node. Accordingly, the present invention, and particularly the IC 64, provides the capability of connecting a variety of node types to the network 30 without requiring that expensive additional processing power be added to the existing node electronics.

The present invention further provides an IC design that is simple enough to be inexpensively implemented, yet capable of handling some of the more complex tasks associated with communicating with the data network 30. For example, the IC 64 uses information received from the master controller 40 to establish a local clock frequency for its node, while also facilitating the transfer of data between the node device and the fiber optic network 30. The IC 64 also addresses the problems associated with propagation delays caused by the time that it takes for light that enters one end of a fiber optic cable to travel to the other end. Although such delays are ordinarily small for cable lengths of a few meters, the delay may become significant enough at high frequencies to cause data transmission errors. Also, different lengths of cable cause different propagation delays. Thus, data sent from the master controller 40 through the hub 32 to two separate nodes arrives at different times if the lengths of the receiving cables for the nodes are not equal. Without compensating for these delays, the nodes would fall out of phase synchronization with one another at high frequencies, thereby increasing the likelihood of data collisions occurring on the bus. The present invention corrects this timing problem by providing a relatively simple circuit configuration that corrects phase differences between the local clock at the node and activity occurring at the central hub. The circuit basically observes its own transmission at the hub, and advances its transmissions by an appropriate amount so that proper alignment is observed at the hub.

The present invention also provides flexibility by allowing the IC 64 to be electronically configured to match the communication capabilities of its associated node. The configuration of an IC can include a variety of parameters and/or functions. For example, the IC 64 may be electronically configured to adapt to the timing and data requirements of the node interface outputs to the particular node component. The IC 64 includes a data memory capable of receiving and holding data received from the high speed network at the network data rate, then outputting that data to the IC's node interface at the whatever rate is compatible with the node. Other configuration parameters can include rather fundamental communication information such as the time slots that are available on the network for that node to transmit or receive data. Providing this type of configuration information for an individual node IC 64 can be performed either locally or remotely. Local configuration can be utilized with intelligent nodes that have on-board computing capabilities, while remote configuration is required for "dumb" nodes that do not have sufficient on-board computing capabilities. For a dumb node, the master controller would provide the necessary information to the IC to set up the timing and other communication protocols at node. An intelligent node would have sufficient computing capabilities to provide a portion of the necessary IC set up information on its own. In either case, the master controller broadcasts all of the necessary information to the IC and/or its associated node. For dumb nodes, the necessary information includes information about what data is on the bus, along with explicit instructions indicating when that node needs to listen to the data that is on the bus. For intelligent nodes, the necessary information includes information about what data is on the bus, and the node uses its own computing capabilities to determine whether it needs to receive the data.

Turning now to the details of the preferred embodiment, FIG. 1 depicts a fiber optic network 30 comprising a plurality of devices or nodes arranged in a star-shaped topology around a central hub 32. A master controller 40 is connected to the hub 32 in a similar fashion as the nodes. The master controller 40 is provided with conventional processing capacity, via on-board conventional programmable microprocessors, random-access-memories and read-only-memories. The master controller's processing capabilities are sufficient to carry out (using conventional network communication methodologies) the network timing and configuration tasks according to the parameters of the present invention as set forth herein. The master controller 40 typically includes an external clock generator such as a timing crystal. The network configuration information instructs the individual nodes as to the specific time slot(s) in which a particular node can place data on the network 30 or receive data from the network 30.

The present invention is directed primarily toward the physical layer of the network 30, particularly, the use of an IC interface 64 (shown in FIGS. 2, 3 and 9–14) to isolate the nodes from the complexity of the network data bus, along with a particular set of data bus communication protocols and IC hardware designs that reduce the relative complexity of the data bus communications, thereby allowing the interface IC to be implemented as a relatively inexpensive component. The physical layer of the present invention may be implemented in an otherwise conventional network architecture divided into several layers, with the higher level layers controlling in a conventional manner the details of how the master controller's tasks are carried out.

The nodes shown in FIG. 1 are multimedia and other non-critical utility devices including an amplifier/speaker set 48, a LCD screen 42, a user interface 44, a navigation system 46 (for e.g., a GPS receiver), music playback devices 50, a digital radio 52, a compact disc changer 54, a video-playback device 56, and a rear-seat audio component 58. Some of the nodes (such as the amplifier/speaker 48 and the LCD screen 42) are capable of only receiving information from the hub 32, while other nodes (such as the user interface 44, the navigation system 46, music playback devices 50, the digital radio 52, the compact disc changer 54, the video-playback device 56, and the rear-seat audio component 58) are capable of receiving and transmitting data to the hub 32. The illustrated nodes are intended only as examples of the types of devices that could be connected to the high-speed fiber optic network 30, and nodes other than those illustrated could be incorporated into the network 30 without departing from the prevent invention.

The star-topology configuration illustrated in FIG. 1 is the preferred architecture for the network 30 embodying the present invention, particularly with respect to vehicular applications. In a star topology, all information sent to the hub 32 is simultaneously transmitted to all of the connected nodes. The failure of one node would not prevent information from being transmitted to the remaining nodes. The fiber optic data bus of the network 30 is more advantageous than a wire network when transmitting high-bandwidth data such as video, because the cost of a wire network increases dramatically as the operating frequency increases.

All of the nodes are connected to the central hub 32 via a fiber optic receive line 36. In addition, those nodes that are capable of transmitting information are connected to the hub 32 via a fiber optic transmit line 34. The fiber optic lines are preferably commercially available, automotive-grade, flexible, clear plastic tubes or cables capable of transmitting light with a limited loss of intensity. The plastic has an angle of diffraction such that light present within the cables will reflect off of the outer surface of the cable and continue traveling toward the opposite end of the cable. The fiber optic cables preferably have a large aperture, which allows them to be efficiently coupled to low-cost fiber optic components.

The central hub 32 is a relatively simple component that is constructed from substantially the same material as the fiber optic cables. In the preferred embodiment, the hub 32 is essentially a flat rectangular piece of plastic. All of the transmitting cables 34 connect to one end of the hub 32, and all of the receiving cables 36 connect to the opposite end of the hub 32. In a conventional manner, the physical dimensions of the hub 32 are such that the light impulses received from the transmitting cables 34 are evenly distributed to all of the receiving cables 36, preferably with minimal loss. The receiving cables 36 then transmit the light from the hub 32 to all of the connected nodes. Thus, data transmitted by one node to the hub 32 is distributed to all nodes connected to the hub 32.

Data is transferred through the fiber optic network 30 as pulses of light that represent binary information. A bright pulse of light represents a binary value of one, and an absence of light represents a binary value of zero. Of course, many factors can impact the precise light intensity. The plastic fiber optic cables will have some attenuation, so the light exiting a particular cable is less intense than the light that entered that cable. Additional attenuation results from the light being distributed throughout the hub 32 and split among several receiving cables 36 such that light exiting the hub 32 is less intense than the light that entered the hub 32, thereby further reducing the intensity of the light that reaches the nodes.

Preferably, the various influences on light intensity are not allowed to alter the value of the data being transmitted. One way of accomplishing this would be to provide a flexible receiver that is capable of adapting its threshold according to the various outside influences on the received light's intensity. In any event, the threshold light intensity distinguishes a binary value of zero from a binary value of one. Light intensity above the threshold is treated as a logical one, and light intensity below the threshold is treated as a logical zero. The light receiver should be flexible enough that the many influences that may impact light intensity (such as attenuation due to the length and number of fiber optic cables) do not ordinarily cause the receiver to mistake logical "one" for logical "zero" and vice versa. Thus, although the intensity of the light traveling through the network 30 may experience some attenuation, the integrity of the data will be maintained.

Figure 2:
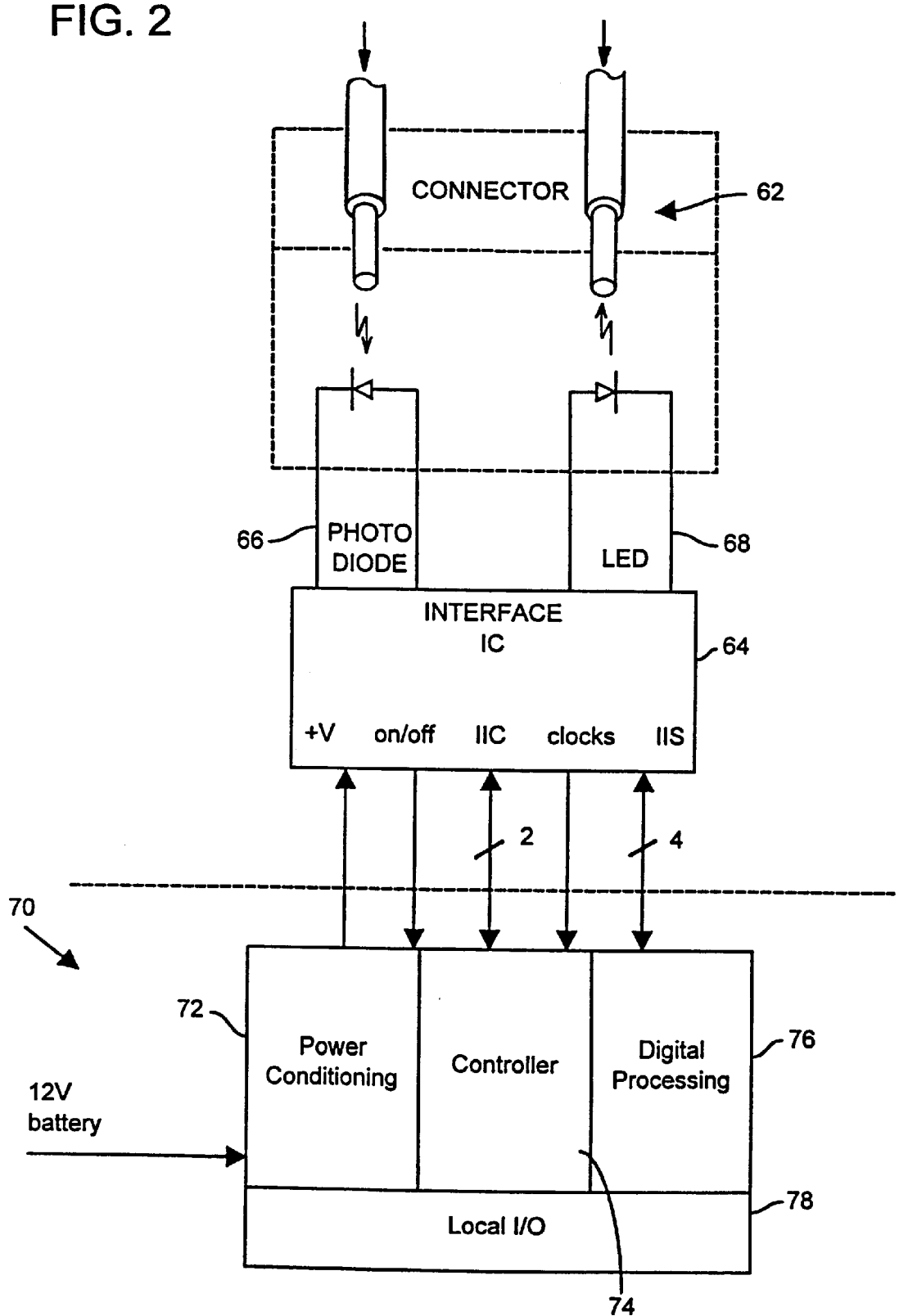
FIG. 2 is a block diagram showing the interface between the fiber optic data bus and one of the receive/transmit nodes shown in FIG. 1.
Figure 3:
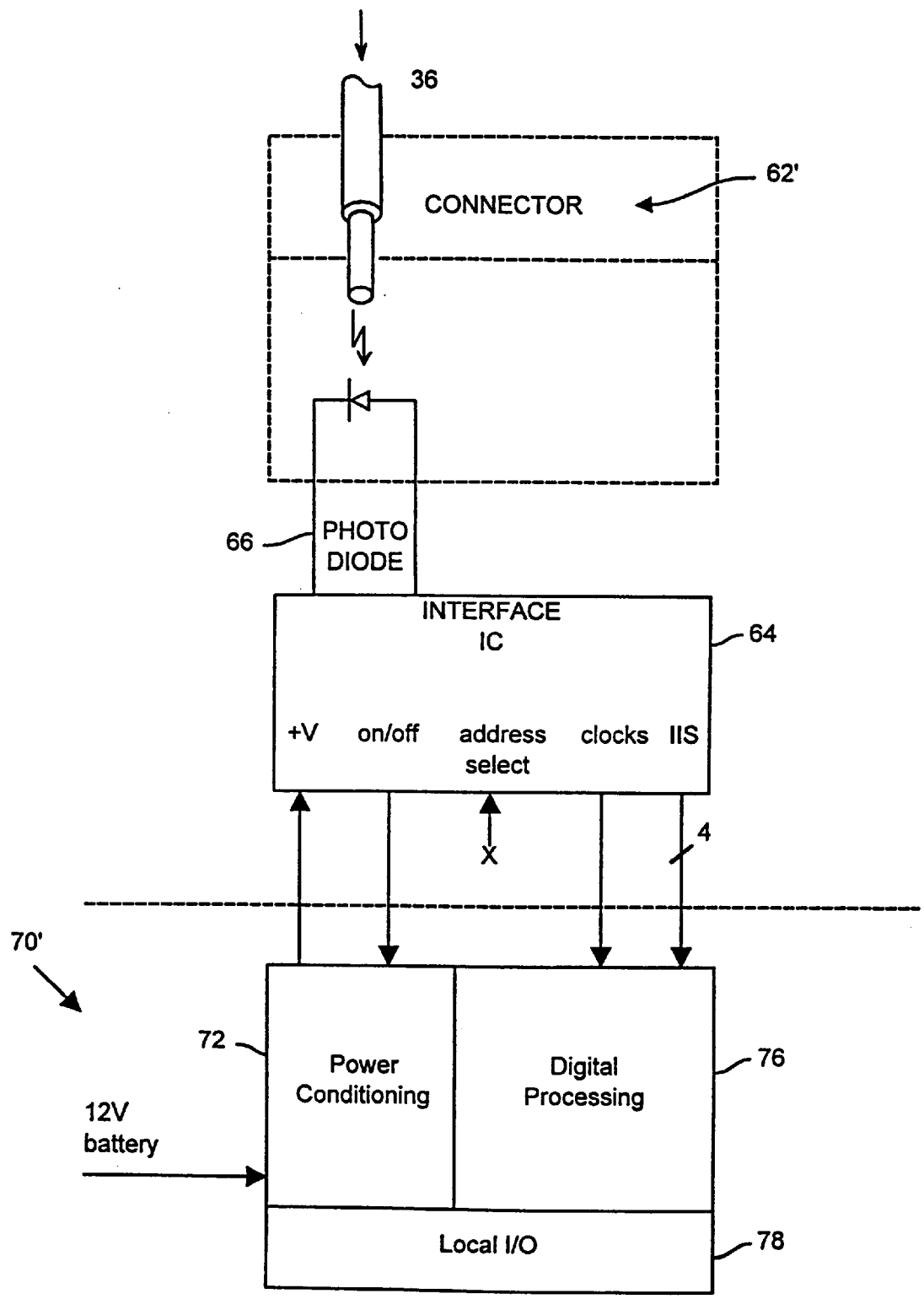
FIG. 3 is a block diagram showing the interface between the fiber optic data bus and one of the receive-only nodes shown in FIG. 1.

FIGS. 2 and 3 are block diagrams showing more detailed representations of the interface between the fiber optic data bus (i.e., transmit cables 34, receive cables 36 and hub 32) and one of the nodes (represented in FIGS. 2 and 3 by reference numbers 70 and 70') shown in FIG. 1. A connector 62 connects the transmit cable 34 and the receive cable 36 to the IC 64. The connector 62 is preferably a commercially available automotive grade connector having a positive latch mechanism for securing the optical fibers connected thereto. The connector 62 makes a physical connection with the transmit and receive cables 34, 36, optically couples the receive cable 36 to a photodiode 66, and optically couples the transmit cable 34 to a LED 68. The connector 62 also makes both a physical and an electrical connection between interface IC 64, the photodiode 66 and the LED 68.

The dotted line in FIGS. 2 and 3 that separates the IC 64 from the node 70 or 70' is a graphical representation of the interface between the node 70 and the bus electronics (represented by the IC 64). The existing electronics at a given node will vary from node to node, and not all of the node components shown in FIGS. 2 and 3 would necessarily be present. The node electronics shown in FIGS. 2 and 3 are general graphical representations of the typical components found at a given node. A typical node 70 may include a power conditioning circuit 72, a node controller 74, digital processing circuitry 76 and a local I/O interface 78. The power conditioning circuit 72 is typically a power supply, the controller 74 is typically the node microprocessor that controls the node, the digital processing section 76 represents the processing of actual data that comes over the network. For example, if the node 70 is responsible for performing tone controls, the digital processing section 76 would receive the audio data from the IC 64, implement a base and treble function, then put the data back on the network 30 via the IC 64. The local I/O 78 can be any type of local node input and output function such as a control head having buttons and/or a display.

The communication ports between the IC 64 and the node 70 can include, for example, a +V port connected to the node power conditioning section 72, an on/off port also connected to the node power conditioning section 72, an IIC (inter IC control) port connected to the node controller 74, an IC clock port connected to the node digital processing section 76, and an IIS (inter IC signal) port also connected to the digital processing section 76. In general, the +V connection provides power connections, the on/off port provides power moding functions, the IIC is a control interface that provides low bandwidth (up to about 1 Mbs) control signals, the clock signals out of the IC 64 to the node 70 are synchronized to the network 30, and are used for processing the data and/or as a local reference to the node, and the IIS port would be for the actual data payload and could go up to speeds of 10 Mbs or higher. The IC interface ports shown in FIGS. 2 and 3 are exemplary and preferred, however, other ports are equally possible. The intent is to provide the flexibility that would allow the IC 64 to be configured to provide a natural interface with a variety of nodes. The IIC and IIS formats are known and widely available serial data formats for audio data. The IC 64 could be provided with a specially designed serial data format, or with other known serial data formats for other types of data. For example, a standard serial interface protocol appropriate for video would be a SPI (serial peripheral interface) protocol.

Data, preferably in the form of optical light pulses, travels from the central hub 32 through the receive line 36 to the photodiode 66. The received light causes the photodiode 66 to transmit an electrical pulse to the interface IC 64 that is proportional to the intensity of the light received. The IC 64 amplifies and processes this electrical signal as data. The transmission line 34 is connected to the LED 68. To transmit data to the network, the IC 64 sends an electrical pulse to the LED 68. This causes the LED 68 to send a pulse of light into the transmission cable 34, where it is transmitted to the central hub 32 and distributed to all of the connected receiving lines. In the preferred embodiment, the LED uses red light with a wavelength of about 660 nm.

The IC 64 shown in FIGS. 2 and 3 transmits data between the network and a digital processing subsection 76 of the external node device 70, 70' through the use of a IIS interface. IIS is a data format/protocol commonly used in audio digital signal processors. It requires only four pins for serial data communication—data in, data out, bit clock, and word clock. The bit clock rate on the IIS interface is variable so that data can be transmitted to and from the interface IC 64 at rates accommodating devices that operate at speeds slower than the optical network. The IC 64 has an internal memory used to capture information received from the network as high-speed bursts. The IC 64 can then transfer the information out of its memory at a slower transfer rate that is matched to the existing data receive/transmit capabilities of the node. For example, the fiber optic network 30 is capable of transmitting CD-quality digital audio over 50 times faster than it is typically played. The interface IC 64 allows a compact disc player node to transfer a packet of audio information through the network to an amplifier/speaker node as a high-speed burst, taking $1/50$ of the time it would take to transfer the packet at the standard playback frequency. The network 30 then uses the other $49/50$ of the normal transfer time to transfer additional information such as digital video between other nodes. An interface IC 64 at the audio receiver node captures the high-speed data burst and stores it in local memory on the IC 64. The IC 64 at the audio receiver node then provides the data to the receiver at the standard playback rate. Thus, the interface IC 64 completely isolates the receiver devices at the nodes from the complexities of the high-speed network and create a "virtual" connection so that the devices appear to be directly coupled to one another.

A controller 74 on the node device is connected to the IC 64 through an IIC compatible (but preferably faster) connection. All configuration, status, and message data is available to the external device through this port. In addition, there is an interrupt pin on the IC 64 that can be used to alert the node device. This is especially important in instances when there is a significant rearrangement of network traffic and the various nodes must be prepared for the new configuration in a timely manner. Each node has a power conditioner 72 that supplies power to both the IC 64 and external node hardware. Intelligent nodes also have a local I/O capability 78 to facilitate data transfer throughout the node device.

FIG. 3 depicts a representative configuration for a receive-only "dumb" node 70'. A connector 62' connects the receive line 36 to the photodiode 66. A transmission cable and a LED are not required as the receive-only node device does not transmit information to the network. The interface IC 64 remains the same, except that address pins are used to select the network address of the IC 64 rather than via the IIC interface. The node device may have digital processing 76 and local I/O 78 capability. A power conditioner 72 is present to supply power to the IC 64 as well as the node device.

Figure 4:
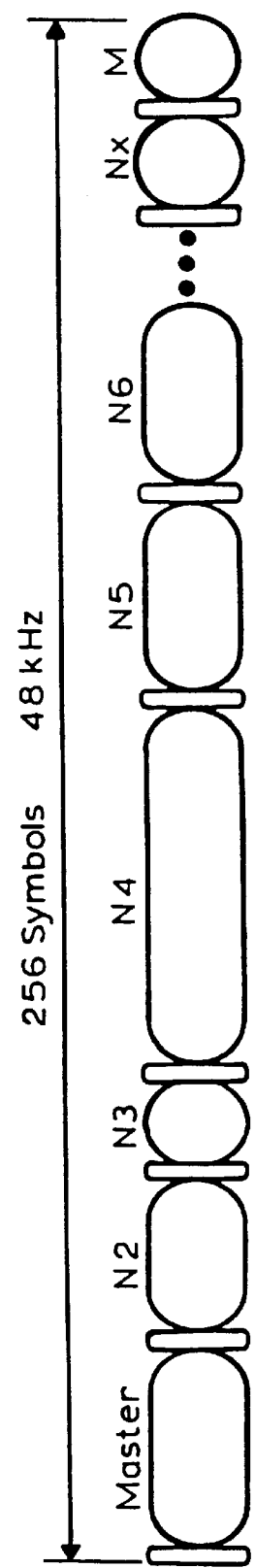
FIGS. 4–8 illustrate a preferred data structure for transmitting data on the fiber optic data bus shown in FIG. 1.

The communication structure used to transmit data over the fiber optic network is detailed in FIGS. 4–8. Communication occurs over the network in frames. As shown in FIG. 4, the frames in the preferred embodiment are 256 symbols long and transmitted at 48 kHz. The bandwidth of the frame is divided into data packets, and the notations "Master", "N2-Nx", and "M" are examples of data packets in a frame. Each packet represents data that is transmitted by a particular node on the network. The number of transmitting nodes per frame is only limited by the 256 symbol bandwidth.

Figure 5:
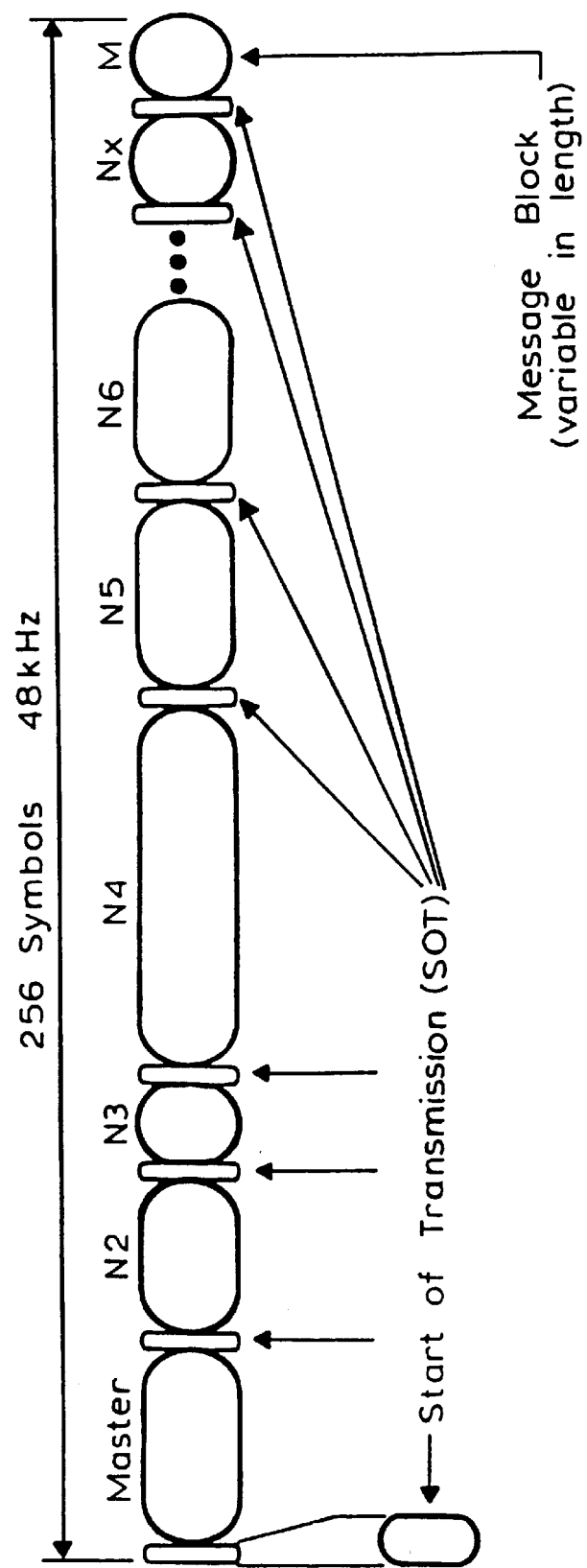

As shown in FIG. 5, the first packet in the frame is preferably sent by the master controller 40, and the last packet is preferably a message packet (M), although this order is not mandatory. All packet transmissions from a different node are separated by a special symbol called the start-of-transmission (SOT) symbol. The interface IC 64 includes circuitry that detects the SOT symbol and recognizes it as the beginning of a new data packet. The packets are preferably of variable lengths that can be configured by the master controller. In the preferred embodiment, each symbol slot represents 384,000 bits per second worth of data. Different node devices have different bandwidth requirements based on the amount of data they produce. For example, voice communication requires only 1 symbol slot per frame to transmit enough data for adequate communication. CD quality audio, however, requires 4 symbol slots per frame. 10× CD-ROM communications requires 37 slots, and 50 slots can be required for uncompressed video. The disclosed frame configuration is flexible enough to give all of these devices a packet that has enough bandwidth to accommodate the data requirements of the device without wasting an excessive amount of bandwidth.

Figure 6:
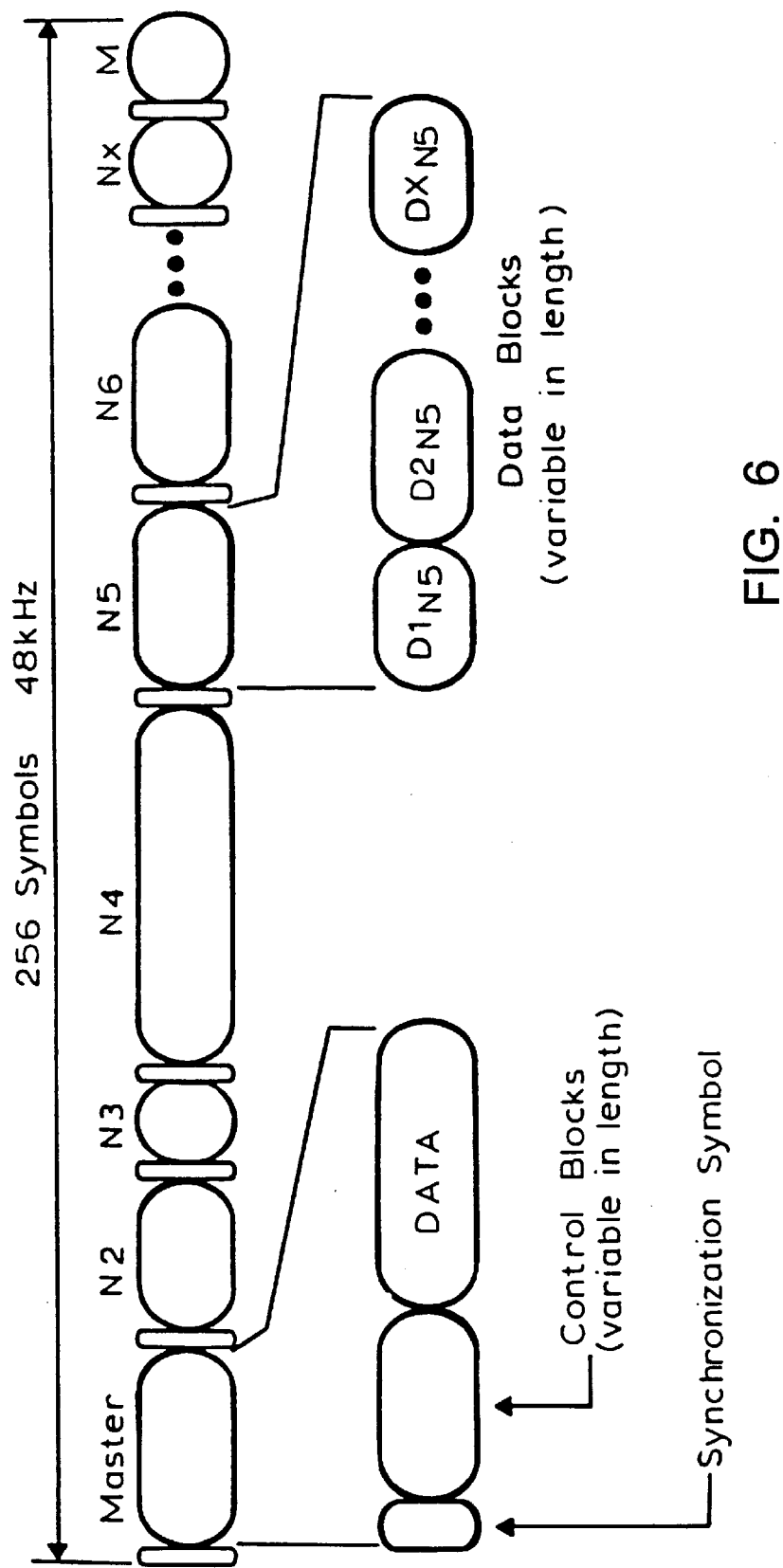

Each data packet can be further divided into a number of data blocks, as shown in FIG. 6. For example, a video camera node may transmit a digitized video data block as well as a digitized audio data block. Both blocks could be transmitted by the node in the same packet. The master controller packet is sub-divided into a control block and a data block. The control block is where some of the configuration information is sent from the master controller to the other nodes. The configuration information defines how the frame is divided into packets and at what symbol slot a node can begin transmitting onto the network. Each node receive this configuration information via its IC 64 and store it in a configuration memory 154, 156 (shown in FIG. 14b) on its interface IC 64.

The master controller 40 does not need to send all of the configuration information at once. Instead, the configuration memory can be transmitted by the control block over the span of several frames. However, the network preferably does not change configurations until the entire new configuration has been transferred. This approach allows the master controller to send out new configuration memory piece by piece, which is advantageous if most of the network bandwidth is required for data transfer and only a small portion is left to transmit new configuration information.

The first symbol of the control block from the master node 40 is a synchronization (SYNC) symbol. The SYNC symbol immediately follows the SOT symbol which identifies the start of the packet. The IC 64 includes circuitry that identifies the unique SOT/SYNC combination. This symbol sequence is used to identify the start of a new frame, along with the location of the control block.

The message packet uses a token-passing arrangement that allows nodes to transmit additional information in a frame. The master controller gives a specific node (via its interface IC 64) the token at the beginning of the frame. The token allows the node to transmit information during the message packet portion of the frame. Messages are of variable length and may take more than one frame to transmit. Once the node completes its message, it transmits an end-of-message (EOM) symbol. The EOM symbol instructs the master controller that the message has been completed and that the token can be passed to the next node. The nodes may receive the message in one of two ways. First, the nodes can receive the message directly from the hub as it is transferred from the message-generating node. Second, the message can be received by the master controller and then rebroadcast by the master controller during a subsequent frame.

Figure 7:
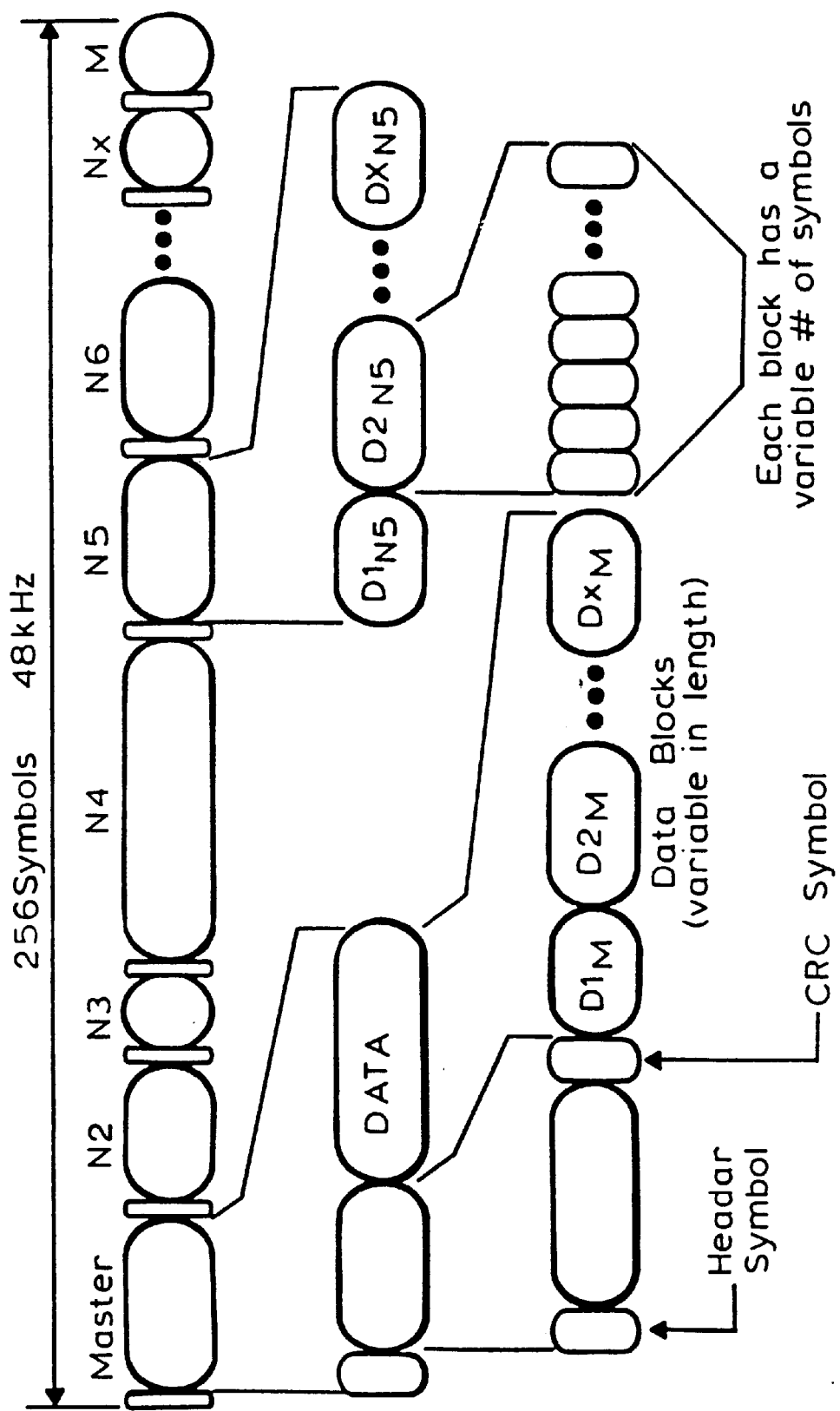

FIG. 7 shows greater detail of the master controller packet. A header symbol follows the SYNC symbol. The header symbol is used to extend the start of frame identifier from two symbols (SOT/SYNC) to three. While a three symbol start-of-frame identifier decreases the bandwidth of the network by one symbol slot, the longer three symbol identifier allows the system to identify the start of the frame more accurately. The header symbol is followed by a variable length control block. A CRC symbol provides a checksum for the control block to ensure error-free transmission. The CRC symbol is followed by the data packet for the master controller node. The data packet of the master controller can also be subdivided into multiple data blocks. FIG. 6 illustrates that each data block from the various nodes can also be comprised of a variable number of symbols.

Figure 8:
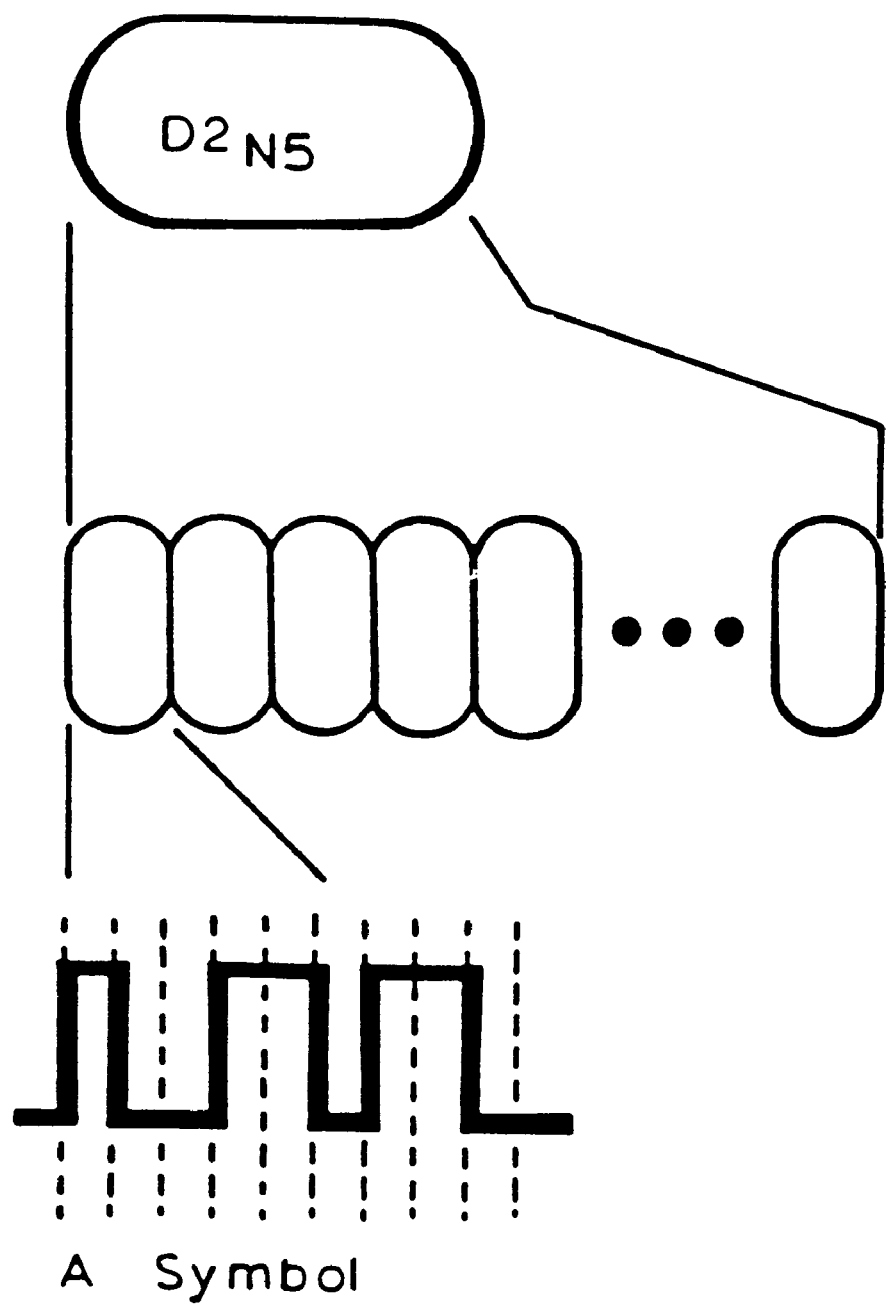

FIG. 8 provides a more detailed representation of the symbols that make up the data packets. As shown in FIG. 8, every symbol in the frame is preferably nine bits long, and each bit represents one of two binary states—logical zero or logical one. On the fiber optic network 30, a bit that is a logical one is represented by a pulse of light above a certain threshold intensity, whereas a logical zero is represented by the absence of light or by a pulse of light below a certain threshold intensity. In the preferred embodiment, the interface IC 64 use 4× oversampling to determine whether a bit is a one or a zero. In this procedure, the IC 64 samples the value of the bits at a speed four times faster than the bits are being transmitted. The IC must then obtain proper time alignment before the bits will be considered valid. This 4× oversampling helps ensure data integrity that may otherwise be compromised by noise or aberrational data spikes in the system.

The communications protocol for the network is extremely flexible and configurable. The protocol can handle a variety of devices, each with different bandwidth requirements and each with a variable number of data streams. The individual node ICs are configured by information sent by the master controller, allowing devices to be connected to the network that do not have microprocessors or other mechanisms for control.

Figure 9:
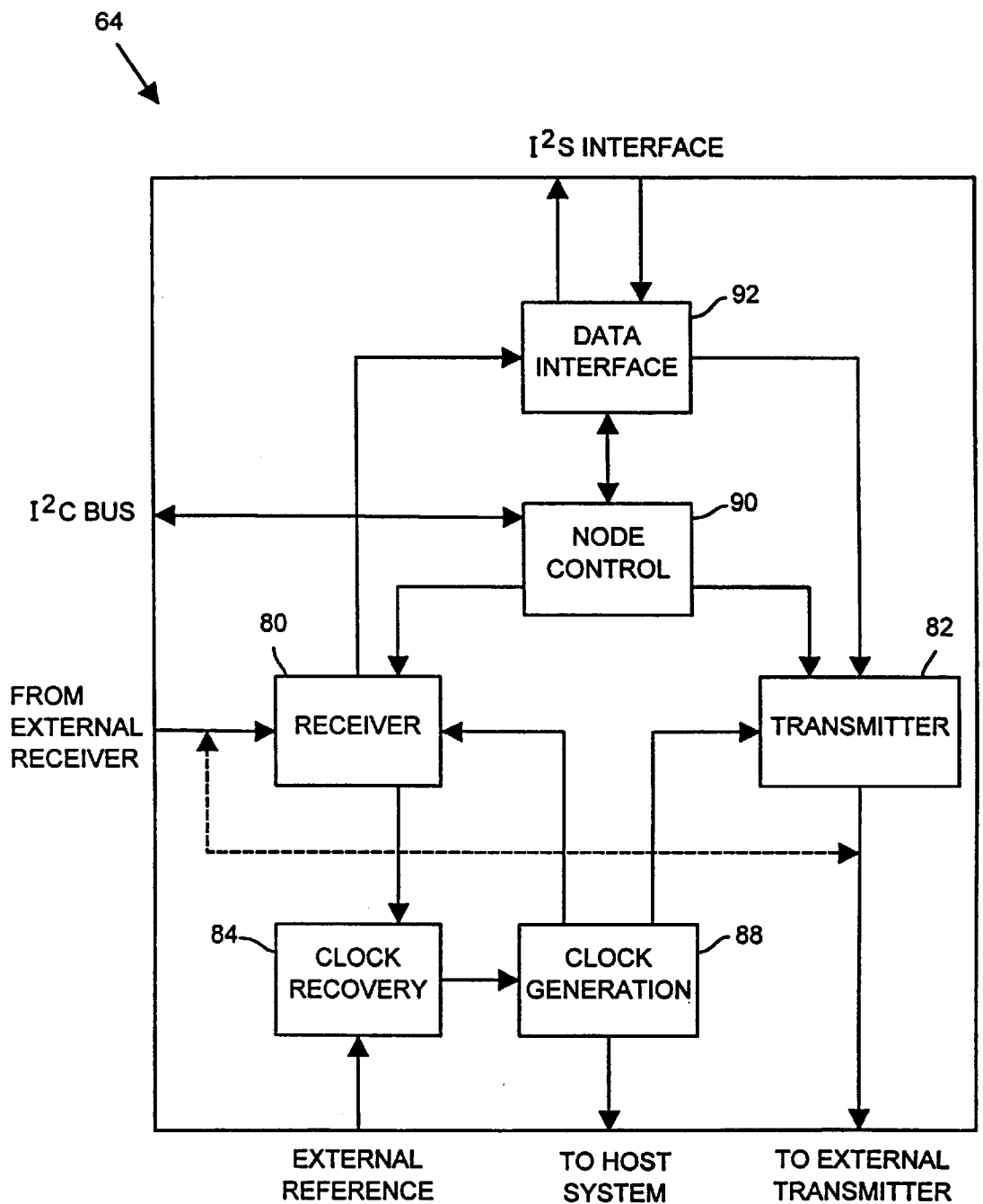
FIG. 9 is a block diagram illustrating some of the major functional blocks of the IC interface shown in FIGS. 2 and 3.

A block-level diagram of the internal functions of the interface IC 64 is shown in FIG. 9. As shown, the IC 64 includes a receiver 80, a transmitter 82, a data interface 92, a node control 90, a clock recovery section 84 and a clock generation section 88. The receiver 80 is connected to an external photodiode (not shown). The photodiode transmits to the receiver 80 electrical signals that are of a strength proportional to the intensity of the light striking the photodiode. The receiver 80 digitizes the signals and converts the bit serial data into nine-bit symbols. The receiver 80 performs conventional error checking on the received data to ensure that valid symbols were received. The nine-bit-symbols are converted to eight-bit data bytes plus flags then sent to a data interface 92 where the data may be communicated to an external node device.

The receiver 80 also performs phase correction on the received data. The local clocks at each of the interface ICs 64 run at a slight phase difference with respect to the central hub 32, and with respect to the other nodes. This is because the IC 64 uses data activity on the central hub 32 as a reference for setting the local clock. However, propagation delays are generated as light travels from the central hub to the individual nodes. This delay is likely to vary from one node to another because the various receive and transmit cables are likely to vary in length. Thus, all of the local clocks at the node ICs 64 on the network 30 will be out of phase with one another due to the difference in the propagation delays. Most of this difference is compensated for by the transmitter 82 estimating the delay and transmitting its signals early by an amount proportional to the estimated delay.

The receiver 80 also compensates for the small residual phase differences that are not accounted for by the transmitter adjusting its transmission time. These residual phase differences are due to errors in transmission compensations that were made, along with clock phase wander that occurs between nodes. In the preferred embodiment, each data packet begins with a nine-bit SOT symbol. The first four bits of the SOT symbol are at the logical zero state and are referred to as the guard interval. The remaining bits follow a specific alignment pattern. The configuration memory on each IC 64 tells the IC 64 ahead of time which symbol slot is going to contain a SOT symbol. The IC knows that, according to its own local clock, the bits arriving at the expected time for bits five through nine should match the alignment pattern.

The residual phase errors cause a slight deviation from the time at which the alignment pattern was expected to arrive and the time at which the pattern actually arrives. For example, the alignment pattern may be received at the time that bits four through eight were expected. The receiver 80 detects that data is arriving at incorrect times and either advances or delays the data sent to the data interface 92 to correct for the phase difference. Thus, all of the data sent to the data interface 92 will be in phase with the local clock for that node IC. The four bit guard interval is set to a logical zero level to create a buffer where data can be received out of phase without causing data conflicts.

The transmitter 82 takes data received from the data interface 92 and transmits it to the network 30. The transmitter 82 is connected to an external LED (not shown) that converts the electrical pulses from the transmitter 82 into light pulses suitable for transmission on the network's optical data bus. The light pulses transmitted from the transmitter 92 to the hub must travel through the transmit fiber optic cable. This cable adds a propagation delay to the signal. The transmitter 82 anticipates this propagation delay and advances the transmission of data by an appropriate time to compensate. The transmitter calculates how far the data must be advanced by sending out a short data transmission to the hub and measuring how long it takes to receive its own short data transmission. If the transmit and receive fiber optic cables are approximately the same length, half of the delay can be attributed to the transmission of the light from the node to the hub and the other half will be the delay in receiving the pulse back from the hub. The amount of time for a node to advance its transmitted data is this combined send/receive delay.

The clock recovery block 84 is used to generate the local sample clock used to oversample the data bits. In addition, the clock recovery 84 compares the start-of-frame signals generated by the local clock with the start-of-frame information sent to the hub by the master controller. If the local clock is severely out of phase with the hub, the clock recovery 84 suspends transmitting and receiving operations for the node and attempts to correct the phase difference. Once the local node is in phase with the hub, it resumes transmitting and receiving. A voltage controlled oscillator in the clock recovery 84 generates the sample clock needed to sample the value of incoming data bits at 4× oversampling.

The clock generation block 88 derives the other clock signals needed by the interface IC 64 from the sample clock generated by the clock recovery 84. The clock generation 88 creates a bit clock by dividing the frequency of the sample clock by 4, a symbol clock by dividing the frequency of the bit clock by 9, and a frame clock by dividing the frequency of the symbol clock by 256. The clock generation block 88 also monitors which symbol slot of the current frame is being transmitted or received.

The node control 90 coordinates the operation of the function blocks on the IC 64. The node control 90 contains the configuration information for the network and instructs the nodes about which slots in the frame are available for transmitting data to the network. The configuration information also instructs each individual node about when information on the network is relevant to that node and should be received and transmitted to the connected node device. The node control 90 includes configuration memory in which the node control 90 stores what type of symbol occupies each frame slot, such as whether the symbol is a data symbol or a control symbol such as SOT or SYNC. This allows the node control 90 to know whether a symbol is going to be a SOT symbol before the symbol is even received. The receiver 80 can then correct phase differences by comparing the time at which the bits of the symbol are actually received versus the expected time. The node control 90 is connected to an IIC bus to allow the configuration information to be optionally communicated to the node in cases where the existing node electronics is capable of receiving and processing the configuration information.

Each IC 64 has two configuration memories—a working memory and an updating memory. New configuration information is sent piece by piece from the master controller to the updating memory of the node IC 64. The node IC 64 will continue to use the old configuration set-up in the working memory until the new configuration has been fully transferred and the master controller signals that the new configuration is to be used at a certain point. At that point, the working memory and the updating memory will essentially swap functions. The updating memory will become the working memory and will be used to define the new network configuration. The old working memory will become the updating memory and will begin accepting new configuration memory piece-by-piece from the master controller.

The data interface 92 transfers data between the IC 64 and the external node device. The data interface 92 has an internal memory that can hold two frames of information. This allows one bank of memory to communicate with the external device (node) at the data transfer rate of the external device while the other bank communicates with the network at a high speed. The bit clock rate on the node data interface (which is shown, by way of example, as an IIS format) is variable to allow the information to be transferred to and from external devices at varying speeds. This flexibility in data transfer reduces the need for additional external components and allows the IC 64 to communicate directly with a variety of devices.

Figure 10:
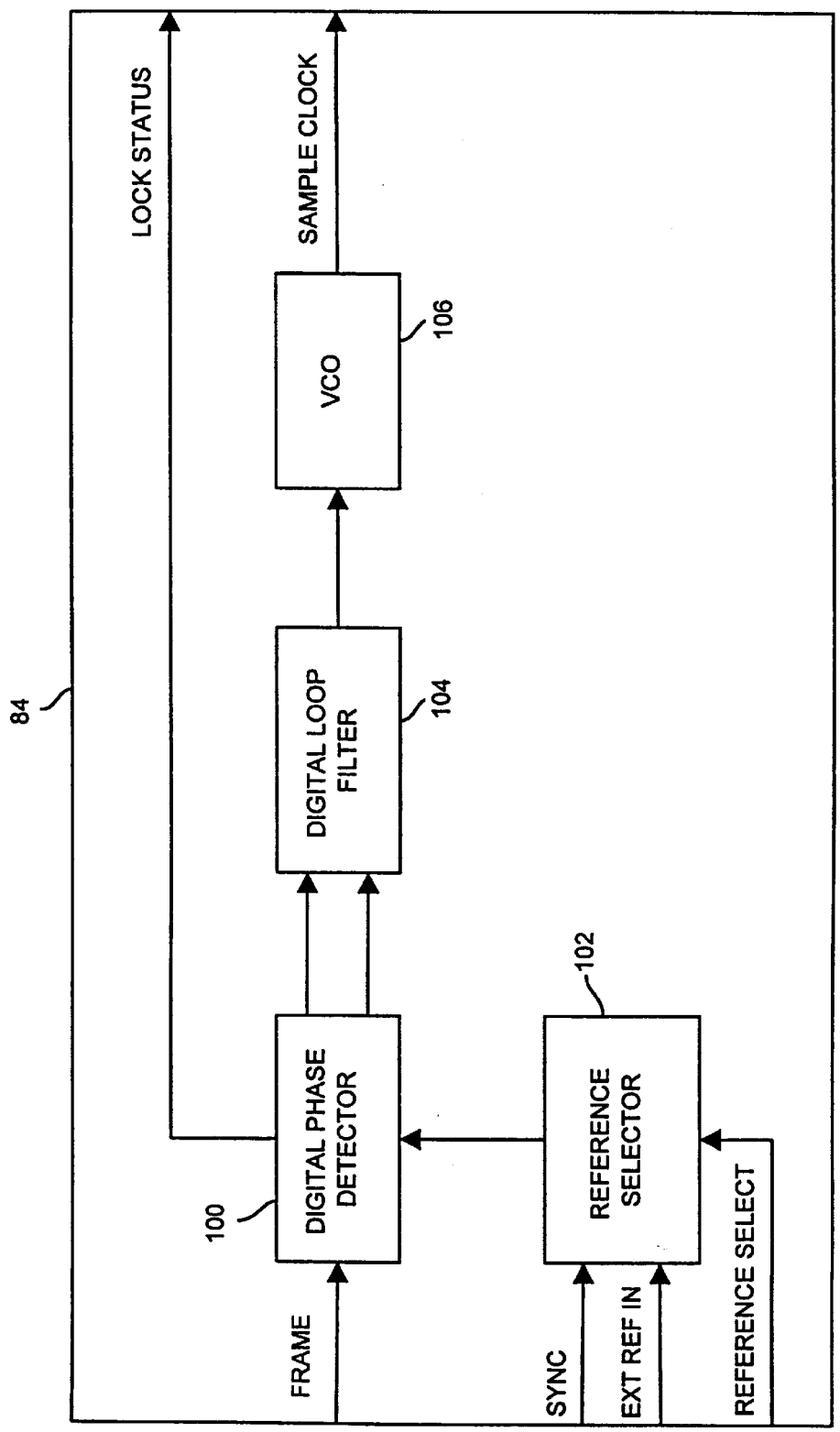
FIG. 10 is a block diagram of the clock recovery section shown in FIG. 9.

The various functional blocks shown in FIG. 9 are illustrated in more detail in FIGS. 10–14. FIG. 10 is a more detailed diagram of the clock recovery 84. The clock recovery 84 includes generally a phase detector 100 (which may be digital or analog), a loop filter 104 (which may be digital or analog), a voltage controlled oscillator (VCO) 106, and a reference selector 102. For most nodes, the digital phase detector 100 compares the phase of the local frame clock and the SYNC pulse generated by the receiver block 80. The SYNC pulse is created by the receive block 80 when it detects the SOT/SYNC symbol combination sent out by the master controller at the beginning of every frame. The two clock signals are compared to provide an indication of whether the local clock is out of phase with the information received from the central hub. If the clocks are synchronized, the digital phase selector 100 activates the lock status flag. A lack of synchronization causes the digital phase detector 100 to deactivate the lock status flag and suspend the transmit and receive operations for the node.

The master controller 40 uses an external clock generator to establish the frame clock for the network 30. The IC 64 associated with the master controller node 40 compares the locally generated frame clock with the external clock reference to ensure that the master node is synchronized. A reference selector 102 switches clock inputs between the SYNC signal and an external clock. The presence of a REFERENCE SELECT signal on most nodes will cause the reference selector 102 to use the SYNC signal as a clock input. The REFERENCE SELECT signal on the master controller, however, instructs the reference selector 102 to use the external reference. The REFERENCE SELECT is preferably provided as an input pin on the IC 64, which allows the same IC to be used to couple either a node 70 or the master controller 40 to the network 30.

The digital phase detector 100 outputs the magnitude and direction of the phase difference to the digital loop filter 104. The loop filter 104 generates an output voltage that controls the VCO 106. The VCO 106 generates the sample clock for the IC, which is the clock used to over-sample the individual data bits. In the preferred embodiment, the sample clock is 9216 times the frame frequency (256 symbols/frame*9 bits/symbol*4 samples/bit =9216 samples/frame). As discussed in more detail below in connection with the receiver block 80, the VCO 106 has a free-running frequency range of no less than 3× to no more than 6× the true bit rate of the network to ensure proper detection of the SOT/SYNC pair in an unsynchronized system.

Figure 11:
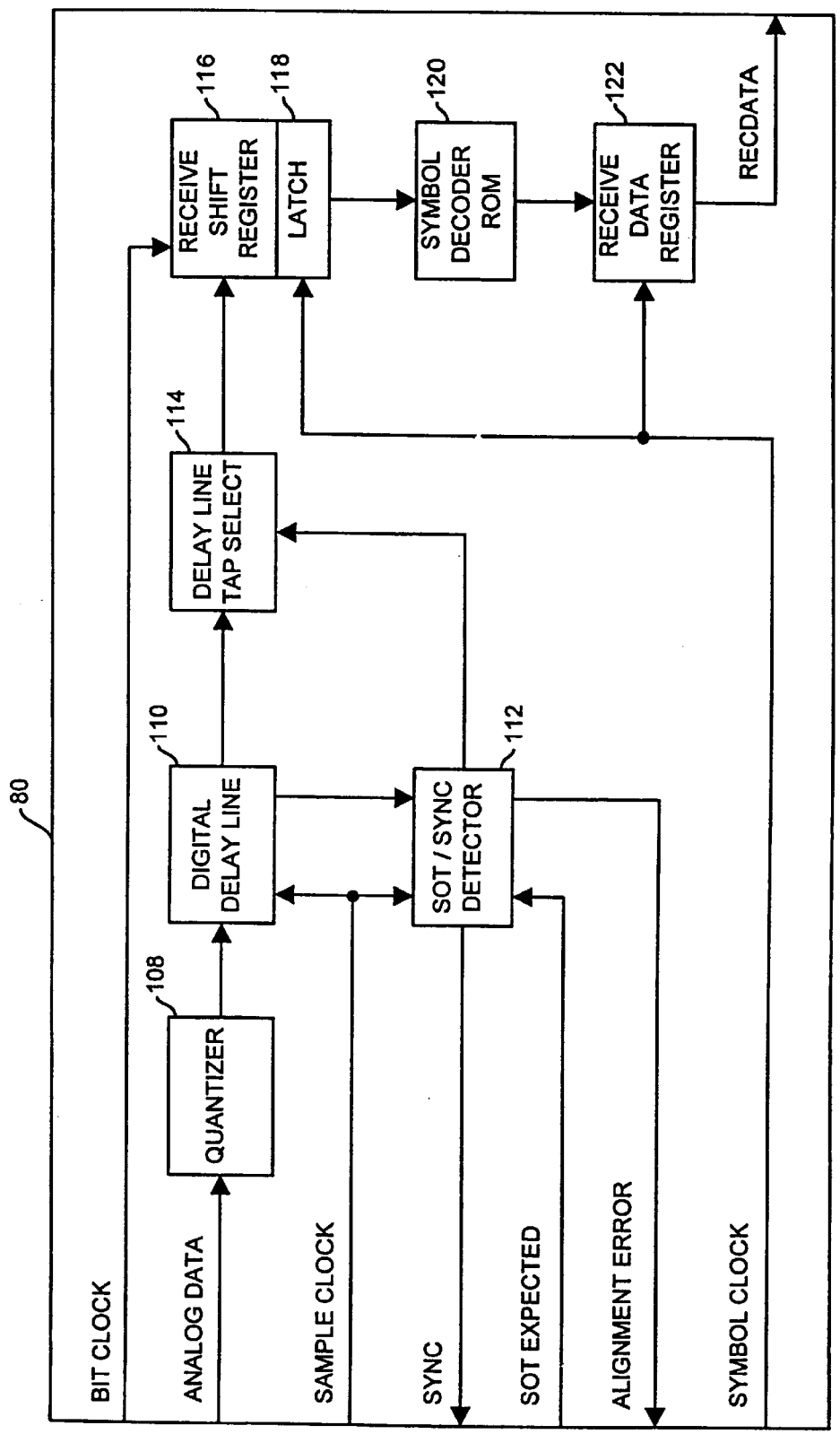
FIG. 11 is a block diagram of the receiver section shown in FIG. 9.

FIG. 11 is a more detailed view of the receiver block 80 shown in FIG. 8. The receiver 80 generally includes a quantizer 108, a SOT/SYNC detector 112, a digital delay line 110, a delay line tap selector 114, a receive shift register 116, a latch 118, a symbol decoder 120, and a receive data register 122. Analog electrical signals are transmitted from an external photodiode (not shown) to the quantizer 108. The analog electrical signals can range in voltage anywhere from zero volts to the maximum voltage output of the photodiode. The quantizer 108 takes this wide range of input signals and outputs a signal that has only one of two values—zero volts, representing logical zero, or the VCC voltage representing logical one. VCC is typically the DC voltage used to power the IC. In the preferred embodiment, the IC 64 is a CMOS chip running on a 3.3 or 5 volt DC source. The quantizer 108 converts any input voltage below a cutoff threshold to a zero volt output, and any input voltage above the threshold to the VCC level representing a binary one.

The logical signal output from the quantizer 108 is sent to a digital delay line 110, which may be implemented as a multi-tap shift register. The sample clock generated by the VCO 106 (shown in FIG. 10) is also input to the digital delay line 110. The logical signal output from the quantizer 108 is sampled at the sample clock rate and stored digitally in the shift register of the digital delay line 110. The multiple taps available on the digital delay line 110 present the data in successive time-shifted positions.

All of the taps from the digital delay line 110 are simultaneously available to the SOT/SYNC detector 112. The SOT/SYNC detector 112 can identify the time position that the SOT and SYNC signals were received by a node to within the resolution of the sample clock period. Once the SOT/SYNC detector 112 detects the two symbol SOT/SYNC combination, it sends out a SYNC signal to the clock recovery block 88 to indicate the start of a new frame. The clock recovery block 88 uses this SYNC signal to synchronize the local frame clock with the SOT/SYNC information sent out by the master controller 40.

The SOT symbol is the first signal transmitted by a node before the node transmits data. The SOT signal has a known bit code that allows the SOT/SYNC detector 112 to compare the time at which the bit pattern was received with the time at which the bit pattern was expected to have arrived. The difference between these two times is the alignment error. Several taps of the digital delay line 110 are available in parallel to the delay line tap select 114. The delay line tap select 114 selects a tap that is properly time shifted so that it corrects the phase error the data had when it was initially received. Each time a new node transmits to the network, a new phase correction must be performed. This is because all of the local clocks on the individual nodes operate at slightly different phases. Each new transmitting node must therefore begin its transmission with the SOT symbol so that the other nodes can lock on to the SOT symbol's known bit pattern and correct for any phase differences.

Before the voltage controlled oscillator is synchronized with the start of frame (SOF) symbols sent out by the master controller, the oscillator may be running within a range of frequencies, preferably from about 3× to 6× the normal system bit frequency. The known 18-bit SOT/SYNC symbol sequence is preferably chosen such that they can be identified at all operating frequencies from 3× to 6× the bit frequency, thereby increasing the ability of the SOT/SYNC detector 112 to identify the start of frame (SOF) symbols needed to bring the VCO 106 into synchronization.

The phase-corrected data is sent serially from the delay line tap select 114 to the receive shift register 116, where the bits are concatenated to form nine-bit symbols. The data is shifted into the receive shift register 116 at the bit clock rate to ensure accuracy. A latch 118 gates the nine-bit symbols at the symbol clock rate. This allows complete symbol data to be available to a symbol decoder 120 while the receive shift register 116 begins serially shifting in the next symbol. The symbol decoder 120 takes the nine-bit symbol and performs a syntax check to determine whether it is a valid symbol. Preferably, not all of the 512 possible symbol combinations are valid symbols. The eight-bit data portion of the symbol takes up 256 possibilities. Special control signals, such as SOT and SYNC, take up additional combinations. The remaining combinations, according to the preferred embodiment, are invalid and must be flagged. The symbol decoder 120 outputs a nine-bit symbol. The first eight bits represent the data portion of the symbol. The ninth-bit is a special symbol flag that indicates whether the first eight bits are data bits, or whether they are a control symbol, an invalid symbol, or some other type of symbol. The decoded symbols are clocked into a data register 122 at the symbol clock rate to ensure glitch-free transmission to the data interface block 92.

Figure 12:
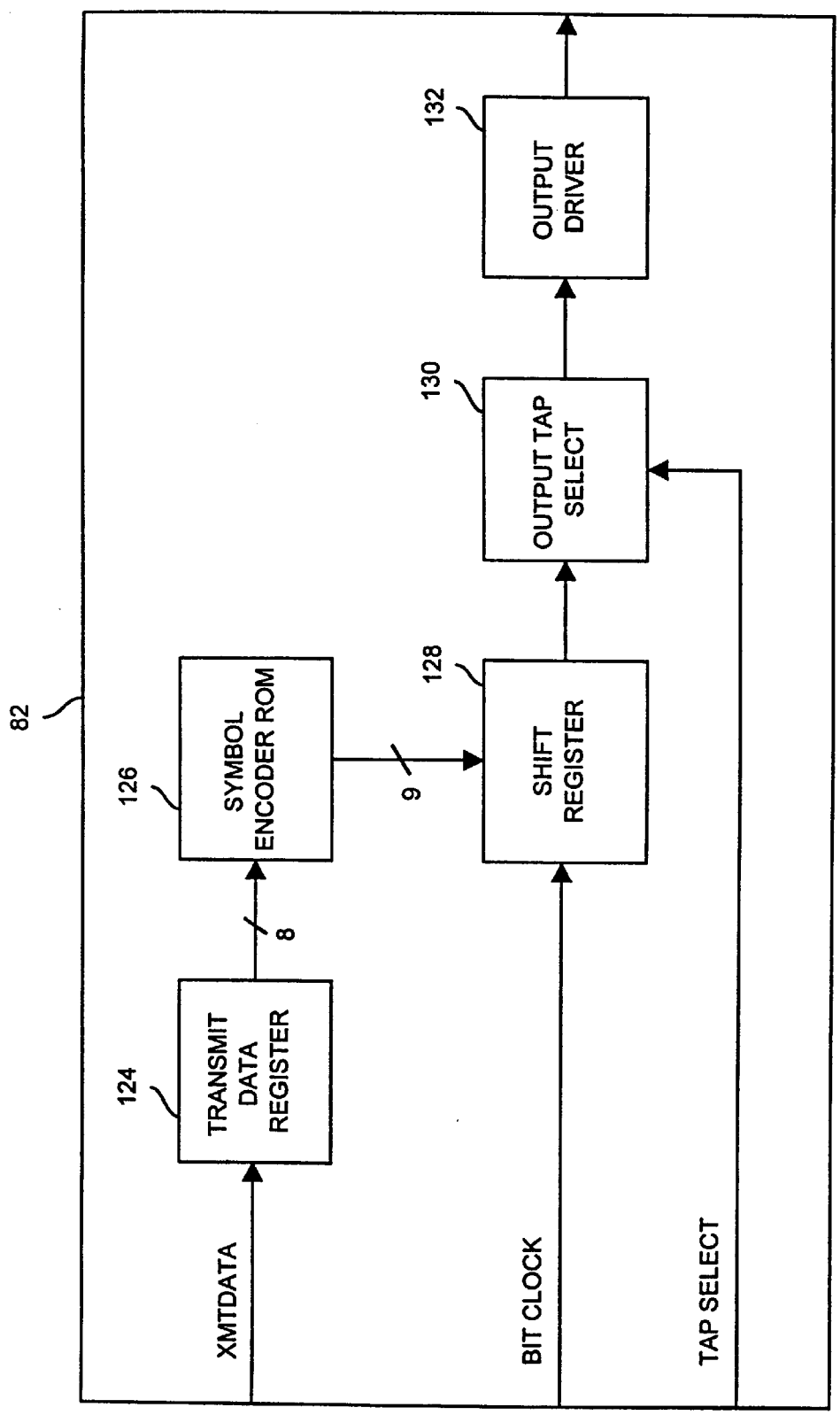
FIG. 12 is a block diagram of the transmitter section shown in FIG. 9.

A more detailed layout of the transmitter block 82 is presented in FIG. 12. The transmitter 82 includes generally a transmit data register 124, a symbol encoder ROM 126, a shift register 128, an output tap select 130, and an output driver 132. An eight-bit data word and a one-bit special symbol flag are sent from the data interface block 92 to a data register 124. The data register 124 clocks in the data at the symbol clock rate to ensure error-free transmission to the symbol encoder 126. The symbol encoder 126 is a read-only memory that takes the 8-bit data word and the one-bit special symbol flag as an address and outputs an encoded 9-bit symbol.

The typical fiber optic data channel is a binary serial channel where information is sent one bit (presence or absence of light for 1 or 0) at a time at a fixed rate. In transmitting arbitrary digital information over a binary channel, such as the fiber optic link where the light is either on or off, it is usually necessary to encode the information bits into a somewhat greater number of channel bits so that timing information can be extracted and the bits can be recovered more reliably. In designing a code for use over such a channel, there are a number of attributes which determine how easily, reliably and effectively information can be conveyed. The attributes can be roughly divided into those which primarily affect how reliably the channel bits can be recovered such as minimum time between channel bit transitions, maximum time between channel bit transitions, time granularity of channel bit transitions, and the on-to-off ratio, and those attributes which primarily affect how efficiently and conveniently information can be coded such as the ratio of channel bits to information bits, block size and symbol alphabet size. The optimum combination of attributes is highly dependent on the channel characteristics.

The fiber optic channel is intrinsically very fast, therefore, inter-symbol distortion is not a problem at the speed and distance needed. Most of the problems are due to the large amount of attenuation introduced by a passive splitter. Minimizing the detector bandwidth improves the signal to noise ratio but causes the noise to manifest itself mostly as edge position uncertainty. To tolerate this, a large time granularity, i.e. channel bit width, is desired. The minimum time between transitions can be one channel bit time because inter-symbol distortion is not a problem. The problem now becomes one of setting the proper threshold between what is considered a 1 or on level and what is considered a 0 or off level. If the signal is AC coupled, as is usually the case when much amplification is needed, the optimum threshold wanders as a function of the DC component, which is the ratio of 1's to 0's in the channel bit stream. Stabilizing the DC component by having an equal number of 1's and 0's over an interval is helpful. Having more frequent transitions with a short time between transitions is also helpful because it allows more opportunities to see the difference between 1 and 0 and adjust the threshold. In many systems, having a short maximum time between transitions, run length, is necessary for proper timing or clock recovery. In summary, long bit duration, low DC component and short run length are the desired attributes of the channel code.

Maintaining a high information rate while keeping the channel bit time as long as possible requires high coding efficiency. High efficiency is more easily achieved when a number of bits are grouped into a block and coded as a whole. Other considerations are data packet granularity, complexity and the ability to represent special conditions as well as the ability to meet the needs of the channel. In this case, coding a block of 8 information bits as a single symbol using 9 channel bit can provide a very good compromise.

The key attributes of the 8 bit to 9 bit code used are low and bounded DC offset, short and bounded run length and the ability to unambiguously represent information outside of an arbitrary data stream. The 8 bit data block can have 256 different values, and the 9 channel bits can be arranged in 512 different ways, but not enough of these meet the DC and run length criteria. The ones that do can be individually mapped to data values while ones that meet the run length but not the DC criteria can be taken in pairs, one with positive offset, the other negative, to represent a single data value. The choice is made to minimize the cumulative DC offset. This technique gives more than enough combinations to represent the 256 data values. The others are available for special purposes. Minor variations of the coding scheme can improve average DC performance at the expense of run length and/or complexity.

Three special purpose symbols have been defined. The start of transmission symbol is really the combination of a non information bearing guard interval and a start position marker. Run length can be violated during the guard interval. The end of message symbol is an explicit representation of the absence of data within the framework and provides a convenient means of delimiting data which would otherwise be ambiguous. The sync symbol provides a means of generating a short sequence of bits which obeys the rules, but cannot be mimicked by any arbitrary data sequence. The sequence chosen also has the property of being unambiguous in the presence of large time scale errors because it is only necessary to distinguish between one and two or more bit times between transitions.

Three different types of 8 bit to 9 bit coding will now be discussed—a minimum run length version, a zero DC version and a compromise version. The minimum run length limit that can be imposed and still have room for 256 different codes which can be freely concatenated is four. Because input data groups (in this case 8 bit bytes) can come in any arbitrary order, some rules are necessary to prevent the concatenation of code words from violating the run length rule. There are 512 potential 9 bit code words. Of these, 258 have runs of 4 or less with runs of 2 or less on each end to allow free concatenation without exceeding the limit of 4. This is a large enough alphabet to encode all 256 possible data bytes with 2 left over for possible use as special delimiters. The distribution of the DC component of the code words is 178 at +/-1/9, 74 at +/-3/9 and 6 at +/-5/9 out of a possible full scale range of +/-9/9 or +/-1. In all cases, half are "plus" and half are "minus". For uniformly distributed random data, the DC component is zero and the average absolute value is 18.5% of full scale. Knowledge of the actual distribution of the data can be taken advantage of by assigning the less desirable codes to the less frequently used data values. More important is to obtain a balance of "plus" and "minus" codes.

As an example, real numeric data tends to contain more small numbers than big numbers, and the least significant bit tends to be the most uniformly distributed. By assigning "plus" and "minus" codes based on the least significant data bit giving lower data values the lower offset codes, the statistics can be improved. Even so, the worst case condition is still +/−77.8% of full scale and long runs of the same value can occur. A known way to improve the statistics is to scramble the input data by adding a pseudo random sequence to give it a more uniform distribution. The same sequence is added at the receiving end to unscramble the data.

Another suitable 8 to 9 bit coding scheme achieves zero DC at the expense of run length. Each data value is assigned two different codes, one with a positive offset and the other negative. During transmission, the offset is accumulated and the code that will drive the accumulated offset toward zero is chosen. With this strategy, the maximum run length is 21. The dual mapping of 256 data values uses all 512 possible codes leaving no room for special characters. If one or more special characters are needed, some characters can be singly mapped to make room. This has little effect on the average performance but can cause the worst case DC component to approach 1/9 full scale. Also, unless the offset accumulator is bounded, the maximum run length can increase.

If 1/9 absolute worst case with much better average performance is acceptable, another solution exists with a maximum run length of five and room for special characters. There are 328 nine bit codes which can be freely concatenated without exceeding a run length of five. Of these, 206 have offsets of +/−1/9, 104 at +/−3/9 and 18 at +/−5/9. A character set of 256 codes can be made by dual mapping 72 of the data characters to have both plus and minus codes and singly mapping the other 184 characters to either a +1/9 or a −1/9 code. The offset is accumulated and when given a choice, about 28% of the time, the code which drives the accumulated offset toward zero is used. Because the dual mapped characters typically have an offset of 3/9, a few dual mapped characters can compensate for the accumulated asymmetry of a large number of singly mapped characters. The offset accumulator should saturate or diminish over time to prevent a long term of bad luck from causing a short term large offset in an attempt to compensate. Additional characters can be defined by trading one double mapped for two single mapped characters. Up to 267 characters can be defined while limiting the offset to +/−1/9. At this point 61 characters, about 23%, are dual mapped. Again, advantage can be taken of a known distribution to increase the frequency of compensation and it is possible to use a scrambler to more uniformly distribute the plus and minus offsets. Both techniques can be used at once by, for example, only having the scrambler modify the least significant bit. Even better DC characteristics can be obtained if the run length of six is allowed.

It is sometimes necessary to have a unique bit sequence which cannot occur with any arbitrary data sequence to provide, for example, unambiguous synchronization. A convenient way to do this is with a rule violation. For the RLL codes, exceeding the run length is easiest but, if that is not desirable, the merging rules can be violated. For the RLL codes discussed herein, a sequence of four consecutive maximum length runs are sufficient. If the codes 010101010 and 101010101 are not included in the character set, then a sequence of more than 16 alternating 1's and 0's cannot occur in arbitrary data and can be used as a unique synchronizing sequence. The advantage of such a sequence is that in the presence of large initial clock errors, it is much easier to distinguish 0 from 00 or 1 from 11 than it is to distinguish 00000 from 000000, or 11111 from 111111.

A exemplary 8-to-9 bit coding scheme is shown in TABLE I located at the end of this specification. The version shown in TABLE I has a run length limit of 6 whereas the numbers discussed above are for a run length limit of 5. The only difference is the number of acceptable codes. This in turn affects the number of codes available for double mapping to reduce the DC component. The "offsets" referred to in TABLE I are the number of ones in a code minus the number of zeros. This provides a measure of the DC component. Preferably, the coding is implemented using a look-up table, so the specific codes shown in TABLE I were assigned arbitrarily from the list of acceptable codes. The exception is that the doubly mapped assignments (where given a choice of + or − offset to reduce the DC component) were given complementary codes (i.e., ones and zeros interchanged) to allow reducing the look-up table size.

The general rules for using the channel codes shown in TABLE I are that the numeric data is exclusive-or'ed with the least-significant-bit of the slot number before and after transmission. Within a transmission (from SOT to next SOT), the offset is accumulated. When given a choice of symbol codes, the one which drives the offset toward zero is used. The exception is the EOM symbol choice (010101010 or 101010101). In TABLE I, the choice is based on the last bit of the preceding symbol to give either 0010101010 or 1101010101. The exception to the exception is the frame synchronization sequence where SOT is followed by the "wrong" EOM. The above rules and symbol coding result in a unique synchronizing pattern ( . . . 110101010101010101011 . . . ) which is recognizable with a large frequency error and a worst case DC component of 4/9 to 5/9. The average DC component is very near to 50% even with a long run of constant input data.

As previously described, the symbol encoder 126 is a read-only memory that takes the 8-bit data word and the one-bit special symbol flag as an address and outputs an encoded 9-bit symbol. The 9-bit output is not simply a concatenation of the 8-bit data word and the one-bit special symbol flag. Instead, the data is mapped to a nine-bit run-length limited (RLL) symbol space. A run-length limited symbol space limits the number of zeros or ones that are transmitted consecutively. Limiting the number of consecutively transmitted logic states minimizes data transfer problems in the presence of clock errors. For example, 010 and 0110 are more easily distinguished than 0111110 and 01111110. The symbol decoder 120 in the receiver block 80 of FIG. 11 reverses this encoding and converts the symbols from a 9-bit RLL symbol space to a standard 8-bit data word with a concatenated special symbol bit.

The encoded 9-bit RLL symbol is latched out of the symbol encoder 126 to the shift register 128. The shift register 128 has many selectable taps, each with a time-shifted version of the same nine-bit symbol. These taps are used to correct for the propagation delay from the node to the hub. Data sent from a node to the hub will arrive at the hub out of phase unless the transmitting node IC 64 corrects for the propagation delay of the signals traveling through the transmit fiber optic cable 36. As the network initially boots up, the master controller 40 brings each node on-line one at a time. As each node is brought up, the node sends out and then receives its own signal. The data interface 92 on the interface IC measures the delay from transmission to reception of the signal, stores this delay time, and uses it generate a tap select signal.

All of the taps from the shift register 128 are available in parallel to an output tap selector 130. The TAP SELECT signal sent from the data interface block 92 chooses a tap that contains data advanced the same amount of time as the propagation delay from the transmit/receive cycle. Thus, data sent from the transmitter will be advanced so that it is out of phase with the local clock when sent, but in phase when it is received back from the hub. The data to be transmitted is shifted serially from the shift register 128, through the output tap select 130, to the output driver 132. The IC 64 connects directly to a LED and must have sufficient current capacity to drive the LED. The output driver 132 amplifies the transmitted data and drives the LED.

Figure 13:
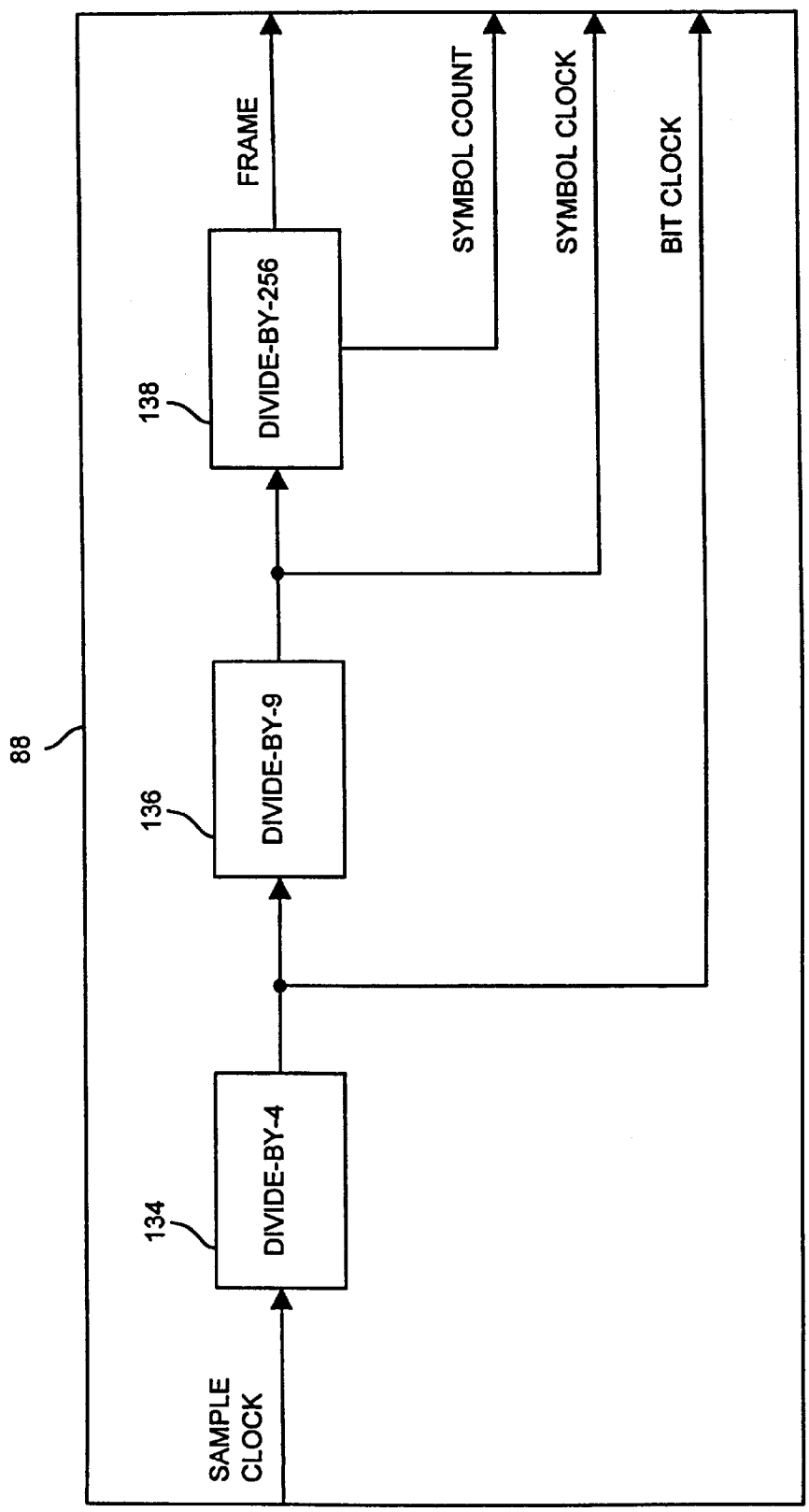
FIG. 13 is a block diagram of the clock generation section shown in FIG. 9.

FIG. 13 is an expanded view of many of the clocks generated by the clock generation block 88. The clock generation block generally includes a divide-by-4 circuit 134, a divide-by-9 circuit 136, and a divide by 256 circuit 138. The clock generation block 88 receives as input the sample clock generated by the VCO 106 of the clock recovery block 84. In the preferred embodiment, the divide-by-four 134 divides the frequency of the sample clock to generate the bit clock. For an oversampling rate other than 4×, the sample clock should be divided by the chosen oversampling rate. The bit clock frequency is divided by nine with the divide-by-nine 136 to generate the symbol clock. The divide-by-256 138 divides the frequency of the symbol clock by 256 to generate the frame clock. The clock recovery block 84 compares this frame clock with the sync pulse generated by the receive block 80 to determine whether the node is synchronized with the central hub 32. The divide-by-256 138 also counts to see which slot of the frame the current symbol is from.

Figure 14A:
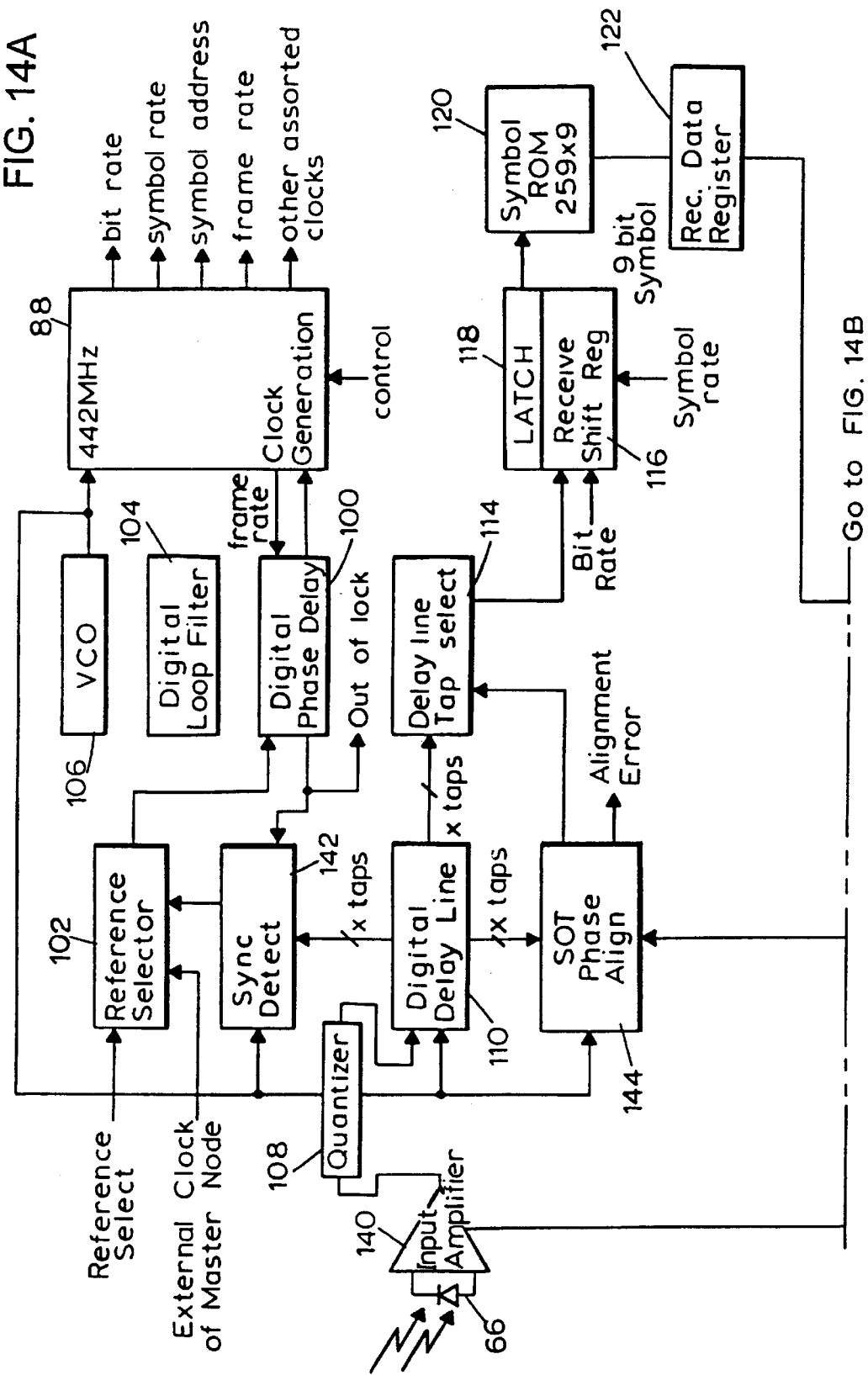
FIGS. 14a and 14b are a detailed block diagram of the IC interface shown in FIGS. 2, 3 and 9.
Figure 14B:
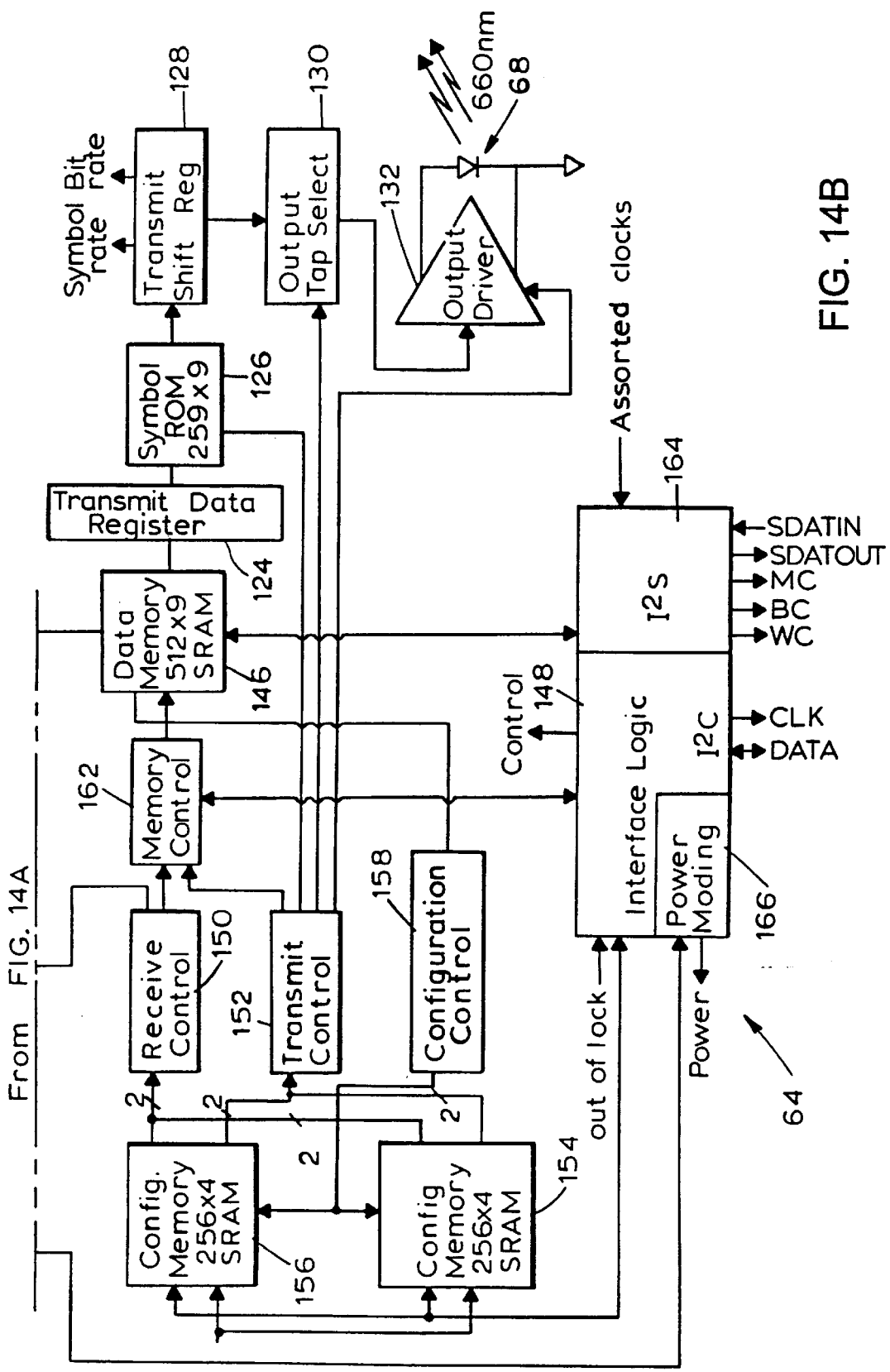

A more detailed layout of the interface IC 64, and of the functional blocks shown in FIG. 9, is shown in FIGS. 14a and 14b. When a node 70, 70' receives information, light travels from the central hub 32 of the network 30 to the photodiode 66. The photodiode 66 converts the light into an electrical signal whose strength is proportional to the intensity of the light striking the photodiode 66. An input amplifier 140 amplifies the signal from the photodiode 66 and transmits the amplified signal to the quantizer 108. The quantizer 108 converts the variable-strength signal into a logic signal whose value can be only one of two voltages—either zero or VCC volts. The output of the quantizer 108 is digitized at the sampling rate and stored in the digital delay line 110. The digital delay line 110 is a multi-tap shift register, with each tap representing the digitized data in progressively time-shifted positions.

A start-of-transmission (SOT) phase align block 144 is used to detect whether the data was received out of phase with respect to the local clock on the IC 64. A receive control 150 reads the current configuration of the network from a working configuration memory 156. The working configuration memory 156 contains the time that the SOT signal should arrive, and provides the receive control 150 with the information on the time the SOT symbol should arrive. The SOT phase align 144 uses this information from the receive control 150 to determine whether the received SOT signal arrived at the expected time or whether it arrived slightly out of phase. The SOT phase align 144 controls the delay line tap select 114 to send the receive shift register 116 data from the tap that has been time-shifted to correct for the phase error. The data is then shifted serially into the receive shift register 116 at the bit rate to form a nine-bit word. The latch 118 captures the nine-bit word at the edge of every symbol clock cycle and holds the data stable for the duration of the next symbol clock cycle. The receive shift register 116 receives the next word while the latch 118 holds the previous nine-bit word stable.

The nine-bit word passes from the latch 118 to the symbol decoder 120 where the validity of the data is checked and the data is decoded from a run-length limited data space. The symbol decoder 120 is preferably a 259×9 ROM that takes the nine-bit word as an address and returns a nine-bit symbol stored at that address. The ninth bit of the nine-bit symbol is a special symbol flag. It informs the IC 64 of whether the first eight bits represent valid data, invalid data, or a special symbol such as SOT or SYNC. The decoded nine-bit word is clocked into the receive data register 122 at the end of every symbol clock period where it remains stable for an entire symbol clock period.

The received data in the receive data register 122 is available as input to a data memory 146. The data memory 146 is preferably a 512×9 dual-banked SRAM capable of storing at least two complete frames of information. The two banks allow the data memory 146 to simultaneously receive data from the receive data register 122 and send or receive data to an external device through an interface port 164 which can output data according to a standard communications protocol such as IIS, IIC, or SPI, or some other standard. Alternatively, the interface port 164 could output data according to a variable communications protocol, the parameters of which are provided by the higher level layers of the network to the interface logic 148 during device configuration. After each frame, the roles of the two banks switch. Data that was received from the fiber optic network in one bank is then available for transmission to the external device, and data received by the other bank from the device is available for transmission to the network 30. During receive operations the data memory 146 is controlled by a memory control 162 and the receive control 150. The receive control 150 reads the working configuration memory 156 to determine the status of the current symbol of the frame. If the working configuration memory 156 contains a code specifying that the symbol being received contains data important to that particular node, the receive control 150 will direct the memory control 162 to place the data memory 146 into write mode and store the data being received. The interface IC 64 will continue to store all of the information relevant to the node in the data memory 146 until the end of the frame. At that point, the two banks of data memory 146 will swap roles and the newly received data can be transmitted to an external device through the output port 164. The bit clock rate on the output port 164 is variable, allowing the interface IC 64 to communicate directly with external devices at the appropriate data rate for that external device, thereby eliminating the need to adjust the external device's electronics to match the data rates and complexities of the network 30 in order to communicate with the network 30.

During the transmit cycle, an 8-bit data word from an external device is transmitted through the interface port 164 to one bank of the data memory 146. After one frame cycle of transfer, a transfer control 152 checks the working configuration memory 156 for the symbol slots that have been designated as transfer periods for the current node. When those slots arrive, the transfer control 152 sends a signal to the memory control 162 and instruct the memory control 162 to place the data memory 146 into read mode. The data memory 146 then transfers the last frame of information it received from an external device to the transmit data register 124. This transfer occurs one symbol at a time, and the transmit data register 124 is clocked at the symbol rate. The eight-bit output of the transmit data register 124 is combined with a special symbol flag from the transmit control 152. This flag identifies whether the eight-bit word coming from the data memory 146 represents data sent by the external device or whether it is a special symbol such as SOT inserted into the data memory 146 by a configuration control 158. The eight-bit word and the special symbol flag are concatenated to form a nine-bit address for the symbol encoder ROM 126. The symbol encoder 126 maps the eight-bit word and special symbol flag into a 9-bit run-length limited symbol space. A RLL symbol space reduces the number of consecutive 1's or 0's in a symbol and reduces the risk of errors due to timing problems. The nine-bit symbol is clocked into the transfer shift register 128, and the transmit shift register 128 stores the symbol in multiple time shifted taps. All of the taps are available in parallel to the output tap select 130. The transmit control 152 identifies which tap to select that will advance the data sufficiently to counteract the propagation delay to the hub. The transmit control 152 identifies this delay time by sending and receiving its own signal when the node is first brought on-line by the master controller 40. The nine-bit symbol is serially shifted from the transmit shift register 128 through the output tap select 130 to an output amplifier 160. The output amplifier 160 amplifies the transmitted bit stream so that it can drive a LED 68 connected directly to the interface IC 64. The transmission is complete when the amplified data passing through the LED is converted into pulses of light that are sent through the transmit cable 34 to the center hub 32 of the fiber optic network 30.

The generation of the local sample clock begins with the digital phase detector 100. The digital phase detector 100 compares the phases of the locally generated frame rate clock with an external clock reference. The external clock reference is passed to the digital phase detector 100 by the reference selector 102. The reference selector 102 passes either the SYNC pulse generated by the master controller or an external reference clock. Slave nodes 70, 70' will generally use the SYNC pulse and the master controller 40 will generally use the external reference. The digital phase detector 100 outputs to the digital loop filter 104 the magnitude and direction that the phase of the local clock differs from the external clock. The digital loop filter 104 sends an output voltage to the VCO 106 that allows the VCO 106 to generate a sample rate clock (and therefore a frame rate clock) that is in phase with the external clock reference. The clock generation block 88 takes the sample rate clock as an input and derives a series of clocks from it, such as a bit rate (sample rate/4), a symbol rate (bit rate/9), and a frame rate (symbol rate/256). The frame rate clock is used as an input to the digital phase detector 100 to check that the IC 64 is in phase with the external reference. In addition, the clock generation block 88 keeps track of which symbol slot of the frame is currently being processed.

The configuration control 158 interfaces between the working configuration memory 156, the updating configuration memory 154, and the data memory 146. Referring momentarily back to FIG. 6, the master controller 40 broadcasts a control block of symbols at the beginning of every frame. The control block contains the configuration information for the entire network 30 and is broadcast to every node. The configuration control 158 reads the control block out of the data memory 146 and converts the block into a special code for every symbol defined in the control block. The control block of symbols is of variable length and will not always define all of the symbols in the frame at one time. The configuration control 158 writes the type of symbol defined into the updating configuration memory 154. Once the configuration control 158 has completely defined an entire frame's worth of configuration information in the updating configuration memory 154, it will upon command swap the working configuration memory 156 and the updating configuration memory 154. At this point, the configuration control 158 will begin sending new configuration information to the old working memory 156 and the updating configuration memory 154 will be used to operate the receive control 150 and the transfer control 152. As will be appreciated by one skilled in the art, there are many different methods by which the interface IC 64 can receive configuration information from a master controller. The configuration control 158 can have many different implementations and can be added to the IC 64 in a variety of manners. In addition, there are many different methods of defining a protocol for transmitting configuration information piece-by-piece from a master controller to the IC 64. The present invention is not limited to any specific embodiment of the configuration set-up and control system.

The configuration control 158 is also responsible for inserting special symbols into a data stream to be transmitted. One implementation would allow the configuration control to write this information directly to the data memory 146. The transmit control 152 would read the working configuration memory 156 to identify at which symbol slot the special symbol was to be inserted. As that symbol was being transferred from the transfer data register to the symbol encoder ROM 126, the transfer control 152 would activate the special symbol flag so that the symbol would be encoded as a special symbol and not as data. Again, the specific implementation of this function could vary greatly. One skilled in the art could design a variety of methods of performing the function of inserting special symbols into the data stream to be transmitted.

The interface IC 64 preferably has a sleep mode (also referred to as "power moding") in which primary electrical functions and power consumption on the IC 64 is temporarily suspended. The input amplifier 140 detects a substantial period of inactivity on the bus. The input amplifier 140 then send a signal to a power moding section 166 to switch the IC 64 into sleep mode. In sleep mode, the only power consumed by the IC 64 is the limited amount required by the IC 64 to continue monitoring the receive line 36 for new bus activity. Sleep mode is discontinued if bus activity is detected by the input amplifier 140. Any node 70, and particularly the master controller 40, can also send a revive signal from the transmit control 152 to the output amplifier 160. This causes the output amplifier to energize the LED 68, causing a light pulse to be sent along the bus, and switching the entire network from sleep mode to normal operation.

Initializing the network can take several frame cycles to complete. The master controller 40 is preferably the first node activated. The master controller 40 first sends and receives a short data transmission to measure the total propagation delay for transmitting data. This information is stored and used thereafter by the transmit control 152 to choose the appropriate amount of time to advance data to correct for the propagation delay. The master controller 40 sends out SOT and SYNC information for several frames to allow the nodes an opportunity to bring themselves into phase with activity occurring at the central hub 32. The master controller then brings each node on-line one at a time. Each node is given an opportunity to measure and store its own send/receive delay. The bus is held inactive for a much greater period of inactivity than the typical four-bit guard period when performing the send/receive operation to prevent data conflicts. Once all of the nodes have been brought on-line, the master node transmits new configuration information to the nodes through the control block of symbols. Once the entire frame has been defined by the master controller 40 (which could take several frames), the network 30 can begin normal operation.

Thus, it is clear from the foregoing detailed description that the present invention provides several advantages. According to the methods and devices of the above-described invention, a variety of node types having a variety of signal processing capabilities and requirements can be placed in communication via the network without having to add processing power to the existing node electronics in order to allow the node to communicate with the network. Accordingly, no costs need to be added to the node electronics in order to allow the node to communicate via the network. This is accomplished by, inter alia, providing an intelligent interface unit between the node and the network's data bus. The interface unit, in the case of a high speed fiber optic implementation, includes connections for coupling to the optical fiber data bus of the network, connections for coupling to the input and output ports of the node, transducers for converting received optical pulses to electrical signals and vice versa, and an interface circuit. The interface circuit, along with its associated protocols, provides the interface unit with sufficient flexibility to allow the same unit to interact with both "intelligent" and "dumb" nodes. Intelligent nodes generally have some level of microprocessing power that can be made available for controlling some aspect of the node's interaction with the network data bus, while a dumb node would generally have either no processing power or no available processing power. Preferably, the interface circuit can be configured to recognize whether its associated node is intelligent or dumb, transfer some portion of the data bus control functions to the node if the node is intelligent, and maintain substantially all of the data bus controls within the interface unit (or some other portion of the network data bus) if the node is determined to be dumb. Accordingly, the interface circuit has the ability to isolate the node completely or partially from dealing with the complexities of interacting with a high speed data bus by providing circuitry that is capable of handling the protocols of the network, transferring some of those protocol-related functions to the node if appropriate, while at the same time providing data in a format/rate that is acceptable for that particular node. Some of the network-related complexities that may be assigned to the interface electronics include data structure and organization information, the transmit/receive slot assigned to that node, node clock synchronization, node clock frequency and phase recovery, slot allocation, and other tasks that must be performed in order to accurately receive or transmit data at high speeds on the network.

Because the interface circuitry isolates the electronics that are already present on the node from the details of the network's high speed bus, the present invention alleviates the burden (and extra cost) that would otherwise have to be placed on the node electronics in order to reside in the high speed network. For example, a node could be a small display or switch pad having a low-end $1 microprocessor that is sufficient for carrying out the node's processing tasks. In order to communicate with a high speed data bus, the node electronics would ordinarily need to be able to receive and process data that is coming by at an extremely high rate, for example 100 Mbs, and that is in a protocol or format that may be relatively complex for the node electronics to process. Ordinarily, this would require upgrading the node to a more expensive (e.g., $10) microprocessor in order to allow the node to handle the complexity of communicating with the high speed data bus of the network. The need to upgrade the node electronics is eliminated in the present invention by providing a dedicated yet flexible interface circuit that is capable of executing the major node communication tasks if the node does not already having capacity for performing these tasks. The portion of the interface that communicates with the network data bus has the processing capacity to communicate with the network according to the network's format, while the portion of the interface that communicates with the node outputs and receives data having the general data characteristics that are compatible with the node. For added flexibility, each interface is provided with the capability of outputting data to its associated node in one of several predetermined formats that are chosen by setting designated memory registers in the interface.

The interface circuit, along with the messaging and control protocols of the network's physical layer, is designed to be capable of handling high speed data, yet simple enough to be implemented as a relatively low-cost component. For example, the interface electronics perform many network-related communications functions such as establishing a local clock for the node, correcting for frequency and phase differences between the local clock and activity occurring at another reference point on the network, and facilitating the transfer of data between the node device and the network. In correcting for phase errors, the interface electronics addresses the problems associated with propagation delays caused by the time that it takes for signals to travel along the data bus transmission medium. Although such delays are ordinarily small for cable lengths in the range of 1–10 meters, at high frequencies the delay may become significant enough to cause data transmission errors. Also, different lengths of cable cause different propagation delays. The likelihood of a data collision increases unless these timing problems are compensated for. The present invention corrects this timing problem by providing a relatively simple circuit configuration that corrects phase differences between the local clock at the node and activity occurring at the central hub. The circuit configuration establishes a local clock frequency at each node, and uses another point on the network as a reference to synchronize the local clock phase. The circuit basically observes its own transmission at the hub, and advances its transmissions by an appropriate amount so that proper alignment is observed at the hub.

By embedding the complexity of the high speed network in a relatively low-cost and flexible interface, the present invention avoids having to increase the cost of a node in order to have it reside in a high speed network. The interface costs is kept down by designing a simple data protocol and hardware that can be implemented in an IC. The IC is made faster by focusing its components on hardware, and that hardware is made simple by its novel design. The needed flexibility is added by allowing the IC to be configured via software commands over the network from a master controller.

Of course, it should be understood that a range of changes and modifications can be made to the preferred embodiment described above. It is therefore intended that the foregoing detailed description be regarded as illustrative rather than limiting and that it be understood that it is the following claims, including all equivalents, which are intended to define the scope of this invention.

TABLE I

EIGHT TO NINE BIT SYMBOL TRANSLATION TABLE

| Name or numeric value: | | Coded symbol: | Offset: |
|---|---|---|---|
| SOT (start of transmission) | ==> | 000011101 | −1 |
| SYNC (part of sync pattern) | ==> | 010101010 | −1 |
| EOM (end of message) | ==> | 000110111 or 111001000 | +/−1 |
| 0 = 00000000 | ==> | 111011100 or 000100011 | +/−3 |
| 1 = 00000001 | ==> | 111011010 or 000100101 | +/−3 |
| 2 = 00000010 | ==> | 111011001 or 000100110 | +/−3 |
| 3 = 00000011 | ==> | 111010110 or 000101001 | +/−3 |
| 4 = 00000100 | ==> | 111010101 or 000101010 | +/−3 |
| 5 = 00000101 | ==> | 111010011 or 000101100 | +/−3 |
| 6 = 00000110 | ==> | 111001110 or 000110001 | +/−3 |
| 7 = 00000111 | ==> | 111001101 or 000110010 | +/−3 |
| 8 = 00001000 | ==> | 111001011 or 000110100 | +/−3 |
| 9 = 00001001 | ==> | 111000111 or 000111000 | +/−3 |
| 10 = 00001010 | ==> | 110111100 or 001000011 | +/−3 |
| 11 = 00001011 | ==> | 110111010 or 001000101 | +/−3 |
| 12 = 00001100 | ==> | 110111001 or 001000110 | +/−3 |
| 13 = 00001101 | ==> | 110110110 or 001001001 | +/−3 |
| 14 = 00001110 | ==> | 110110101 or 001001010 | +/−3 |
| 15 = 00001111 | ==> | 110110011 or 001001100 | +/−3 |
| 16 = 00010000 | ==> | 110101110 or 001010001 | +/−3 |
| 17 = 00010001 | ==> | 110101101 or 001010010 | +/−3 |
| 18 = 00010010 | ==> | 110101011 or 001010100 | +/−3 |
| 19 = 00010011 | ==> | 110100111 or 001011000 | +/−3 |
| 20 = 00010100 | ==> | 110011110 or 001100001 | +/−3 |
| 21 = 00010101 | ==> | 110011101 or 001100010 | +/−3 |
| 22 = 00010110 | ==> | 110011011 or 001100100 | +/−3 |
| 23 = 00010111 | ==> | 110010111 or 001101000 | +/−3 |
| 24 = 00011000 | ==> | 101111100 or 010000011 | +/−3 |
| 25 = 00011001 | ==> | 101111010 or 010000101 | +/−3 |
| 26 = 00011010 | ==> | 101111001 or 010000110 | +/−3 |
| 27 = 00011011 | ==> | 101110110 or 010001001 | +/−3 |
| 28 = 00011100 | ==> | 101110101 or 010001010 | +/−3 |
| 29 = 00011101 | ==> | 101110011 or 010001100 | +/−3 |
| 30 = 00011110 | ==> | 101101110 or 010010001 | +/−3 |
| 31 = 00011111 | ==> | 101101101 or 010010010 | +/−3 |
| 32 = 00100000 | ==> | 011001011 or 100110100 | +/−1 |
| 33 = 00100001 | ==> | 011000111 or 100111000 | +/−1 |
| 34 = 00100010 | ==> | 010111100 or 101000011 | +/−1 |
| 35 = 00100011 | ==> | 010111010 or 101000101 | +/−1 |
| 36 = 00100100 | ==> | 010111001 or 101000110 | +/−1 |
| 37 = 00100101 | ==> | 010110110 or 101001001 | +/−1 |
| 38 = 00100110 | ==> | 010110101 or 101001010 | +/−1 |
| 39 = 00100111 | ==> | 010110011 or 101001100 | +/−1 |
| 40 = 00101000 | ==> | 010101110 or 101010001 | +/−1 |
| 41 = 00101001 | ==> | 010101101 or 101010010 | +/−1 |
| 42 = 00101010 | ==> | 010100111 or 101011000 | +/−1 |
| 43 = 00101011 | ==> | 010011110 or 101100001 | +/−1 |
| 44 = 00101100 | ==> | 010011101 or 101100010 | +/−1 |
| 45 = 00101101 | ==> | 010011011 or 101100100 | +/−1 |
| 46 = 00101110 | ==> | 010010111 or 101101000 | +/−1 |
| 47 = 00101111 | ==> | 001111100 or 110000011 | +/−1 |
| 48 = 00110000 | ==> | 011001101 | +1 |
| 49 = 00110001 | ==> | 100110010 | −1 |
| 50 = 00110010 | ==> | 011001110 | +1 |
| 51 = 00110011 | ==> | 100110001 | −1 |
| 52 = 00110100 | ==> | 011001011 | +1 |
| 53 = 00110101 | ==> | 100101100 | −1 |
| 54 = 00110110 | ==> | 011010101 | +1 |
| 55 = 00110111 | ==> | 100101010 | −1 |
| 56 = 00111000 | ==> | 011010110 | +1 |
| 57 = 00111001 | ==> | 100101001 | −1 |
| 58 = 00111010 | ==> | 011011001 | +1 |
| 59 = 00111011 | ==> | 100100110 | −1 |
| 60 = 00111100 | ==> | 011011010 | +1 |
| 61 = 00111101 | ==> | 100100101 | −1 |
| 62 = 00111110 | ==> | 011011100 | +1 |
| 63 = 00111111 | ==> | 100100011 | −1 |
| 64 = 01000000 | ==> | 011100011 | +1 |
| 65 = 01000001 | ==> | 100011100 | −1 |
| 66 = 01000010 | ==> | 011100101 | +1 |
| 67 = 01000011 | ==> | 100011010 | −1 |
| 68 = 01000100 | ==> | 011100110 | +1 |
| 69 = 01000101 | ==> | 100011001 | −1 |
| 70 = 01000110 | ==> | 011101001 | +1 |
| 71 = 01000111 | ==> | 100010110 | −1 |
| 72 = 01001000 | ==> | 011101010 | +1 |
| 73 = 01001001 | ==> | 100010101 | −1 |
| 74 = 01001010 | ==> | 011101100 | +1 |
| 75 = 01001011 | ==> | 100010011 | −1 |
| 76 = 01001100 | ==> | 011110001 | +1 |
| 77 = 01001101 | ==> | 100001110 | −1 |
| 76 = 01001110 | ==> | 011110010 | +1 |
| 79 = 01001111 | ==> | 100001101 | −1 |
| 80 = 01010000 | ==> | 011110100 | +1 |
| 81 = 01010001 | ==> | 100001011 | −1 |
| 82 = 01010010 | ==> | 011111000 | +1 |
| 83 = 01010011 | ==> | 100000111 | −1 |
| 84 = 01010100 | ==> | 100101111 | +1 |
| 85 = 01010101 | ==> | 011101000 | −1 |
| 86 = 01010110 | ==> | 100011011 | +1 |
| 87 = 01010111 | ==> | 011100100 | −1 |
| 88 = 01011000 | ==> | 100011101 | +1 |
| 89 = 01011001 | ==> | 011100010 | −1 |
| 90 = 01011010 | ==> | 100011110 | +1 |
| 91 = 01011011 | ==> | 011100001 | −1 |
| 92 = 01011100 | ==> | 100100111 | +1 |
| 93 = 01011101 | ==> | 011011000 | −1 |
| 94 = 01011110 | ==> | 100101011 | +1 |
| 95 = 01011111 | ==> | 011010100 | −1 |
| 96 = 01100000 | ==> | 100101101 | +1 |
| 97 = 01100001 | ==> | 011010010 | −1 |
| 98 = 01100010 | ==> | 100101110 | +1 |
| 99 = 01100011 | ==> | 011010001 | −1 |
| 100 = 01100100 | ==> | 100110011 | +1 |
| 101 = 01100101 | ==> | 011001100 | −1 |
| 102 = 01100110 | ==> | 100110101 | +1 |
| 103 = 01100111 | ==> | 011001010 | −1 |
| 104 = 01101000 | ==> | 100110110 | +1 |
| 105 = 01101001 | ==> | 011001001 | −1 |
| 106 = 01101010 | ==> | 100111001 | +1 |
| 107 = 01101011 | ==> | 011000110 | −1 |
| 108 = 01101100 | ==> | 100111010 | +1 |
| 109 = 01101101 | ==> | 011000101 | −1 |
| 110 = 01101110 | ==> | 100111100 | +1 |
| 111 = 01101111 | ==> | 011000011 | −1 |
| 112 = 01110000 | ==> | 101000111 | +1 |
| 113 = 01110001 | ==> | 010111000 | −1 |
| 114 = 01110010 | ==> | 101001011 | +1 |
| 115 = 01110011 | ==> | 010110100 | −1 |
| 116 = 01110100 | ==> | 101001101 | +1 |
| 117 = 01110101 | ==> | 010110010 | −1 |
| 118 = 01110110 | ==> | 101001110 | +1 |
| 119 = 01110111 | ==> | 010110001 | −1 |
| 120 = 01111000 | ==> | 101010011 | +1 |
| 121 = 01111001 | ==> | 010101100 | −1 |
| 122 = 01111010 | ==> | 101010110 | +1 |
| 123 = 01111011 | ==> | 010101001 | −1 |
| 124 = 01111100 | ==> | 101011001 | +1 |
| 125 = 01111101 | ==> | 010100110 | −1 |
| 126 = 01111110 | ==> | 101011010 | +1 |
| 127 = 01111111 | ==> | 010100101 | −1 |
| 128 or −128 = 10000000 | ==> | 101011100 | +1 |
| 129 or −127 = 10000001 | ==> | 010100011 | −1 |
| 130 or −126 = 10000010 | ==> | 101100011 | +1 |
| 131 or −125 = 10000011 | ==> | 010011100 | −1 |
| 132 or −124 = 10000100 | ==> | 101100101 | +1 |
| 133 or −123 = 10000101 | ==> | 010011010 | −1 |
| 134 or −122 = 10000110 | ==> | 101100110 | +1 |
| 135 or −121 = 10000111 | ==> | 010011001 | −1 |
| 136 or −120 = 10001000 | ==> | 101101001 | +1 |
| 137 or −119 = 10001001 | ==> | 010010110 | −1 |
| 138 or −118 = 10001010 | ==> | 101101010 | +1 |
| 139 or −117 = 10001011 | ==> | 010010101 | −1 |
| 140 or −116 = 10001100 | ==> | 101101100 | +1 |
| 141 or −115 = 10001101 | ==> | 010010011 | −1 |
| 142 or −114 = 10001110 | ==> | 101110001 | +1 |
| 143 or −113 = 10001111 | ==> | 010001110 | −1 |
| 144 or −112 = 10010000 | ==> | 101110010 | +1 |

TABLE I-continued

EIGHT TO NINE BIT SYMBOL TRANSLATION TABLE

| Name or numeric value: | | | Coded symbol: | Offset: |
|---|---|---|---|---|
| 145 or −111 | = 10010001 | ==> | 010001101 | −1 |
| 146 or −110 | = 10010010 | ==> | 101110100 | +1 |
| 147 or −109 | = 10010011 | ==> | 010001011 | −1 |
| 148 or −108 | = 10010100 | ==> | 101111000 | +1 |
| 149 or −107 | = 10010101 | ==> | 010000111 | −1 |
| 150 or −106 | = 10010110 | ==> | 110000111 | +1 |
| 151 or −105 | = 10010111 | ==> | 001111000 | −1 |
| 152 or −104 | = 10011000 | ==> | 110001011 | +1 |
| 153 or −103 | = 10011001 | ==> | 001110100 | −1 |
| 154 or −102 | = 10011010 | ==> | 110001101 | +1 |
| 155 or −101 | = 10011011 | ==> | 001110010 | −1 |
| 156 or −100 | = 10011100 | ==> | 110001110 | +1 |
| 157 or −99 | = 10011101 | ==> | 001110001 | −1 |
| 158 or −98 | = 10011110 | ==> | 110010011 | +1 |
| 159 or −97 | = 10011111 | ==> | 001101100 | −1 |
| 160 or −96 | = 10100000 | ==> | 110010101 | +1 |
| 161 or −95 | = 10100001 | ==> | 001101010 | −1 |
| 162 or −94 | = 10100010 | ==> | 110010110 | +1 |
| 163 or −93 | = 10100011 | ==> | 001101001 | −1 |
| 164 or −92 | = 10100100 | ==> | 110011001 | +1 |
| 165 or −91 | = 10100101 | ==> | 001100110 | −1 |
| 166 or −90 | = 10100110 | ==> | 110011010 | +1 |
| 167 or −89 | = 10100111 | ==> | 001100101 | −1 |
| 168 or −88 | = 10101000 | ==> | 110011100 | +1 |
| 169 or −87 | = 10101001 | ==> | 001100011 | −1 |
| 170 or −86 | = 10101010 | ==> | 110100011 | +1 |
| 171 or −85 | = 10101011 | ==> | 001011100 | −1 |
| 172 or −84 | = 10101100 | ==> | 110100101 | +1 |
| 173 or −83 | = 10101101 | ==> | 001011010 | −1 |
| 174 or −82 | = 10101110 | ==> | 110100110 | +1 |
| 175 or −81 | = 10101111 | ==> | 001011001 | −1 |
| 176 or −80 | = 10110000 | ==> | 110101001 | +1 |
| 177 or −79 | = 10110001 | ==> | 001010110 | −1 |
| 178 or −78 | = 10110010 | ==> | 110101100 | +1 |
| 179 or −77 | = 10110011 | ==> | 001010011 | −1 |
| 180 or −76 | = 10110100 | ==> | 110110001 | +1 |
| 181 or −75 | = 10110101 | ==> | 001001110 | −1 |
| 182 or −74 | = 10110110 | ==> | 110110010 | +1 |
| 183 or −73 | = 10110111 | ==> | 001001101 | −1 |
| 184 or −72 | = 10111000 | ==> | 110110100 | +1 |
| 185 or −71 | = 10111001 | ==> | 001001011 | −1 |
| 186 or −70 | = 10111010 | ==> | 110111000 | +1 |
| 187 or −69 | = 10111011 | ==> | 001000111 | −1 |
| 188 or −68 | = 10111100 | ==> | 111000011 | +1 |
| 189 or −67 | = 10111101 | ==> | 000111100 | −1 |
| 190 or −66 | = 10111110 | ==> | 111000101 | +1 |
| 191 or −65 | = 10111111 | ==> | 000111010 | −1 |
| 192 or −64 | = 11000000 | ==> | 111000110 | +1 |
| 193 or −63 | = 11000001 | ==> | 000111001 | −1 |
| 194 or −62 | = 11000010 | ==> | 111001001 | +1 |
| 195 or −61 | = 11000011 | ==> | 000110110 | −1 |
| 196 or −60 | = 11000100 | ==> | 111001010 | +1 |
| 197 or −59 | = 11000101 | ==> | 000110101 | −1 |
| 198 or −58 | = 11000110 | ==> | 111001100 | +1 |
| 199 or −57 | = 11000111 | ==> | 000110011 | −1 |
| 200 or −56 | = 11001000 | ==> | 111001001 | +1 |
| 201 or −55 | = 11001001 | ==> | 000101110 | −1 |
| 202 or −54 | = 11001010 | ==> | 111010010 | +1 |
| 203 or −53 | = 11001011 | ==> | 000101101 | −1 |
| 204 or −52 | = 11001100 | ==> | 111010100 | +1 |
| 205 or −51 | = 11001101 | ==> | 000101011 | −1 |
| 206 or −50 | = 11001110 | ==> | 111011000 | +1 |
| 207 or −49 | = 11001111 | ==> | 000100111 | −1 |
| 208 or −48 | = 11010000 | ==> | 001111010 or 110000101 | +/−1 |
| 209 or −47 | = 11010001 | ==> | 001111001 or 110000110 | +/−1 |
| 210 or −46 | = 11010010 | ==> | 001110110 or 110001001 | +/−1 |
| 211 or −45 | = 11010011 | ==> | 001110101 or 110001010 | +/−1 |
| 212 or −44 | = 11010100 | ==> | 001110011 or 110001100 | +/−1 |
| 213 or −43 | = 11010101 | ==> | 001101110 or 110010001 | +/−1 |
| 214 or −42 | = 11010110 | ==> | 001101101 or 110010010 | +/−1 |
| 215 or −41 | = 11010111 | ==> | 001101011 or 110010100 | +/−1 |
| 216 or −40 | = 11011000 | ==> | 001100111 or 110011000 | +/−1 |
| 217 or −39 | = 11011001 | ==> | 001011110 or 110100001 | +/−1 |
| 218 or −38 | = 11011010 | ==> | 001011101 or 110100010 | +/−1 |
| 219 or −37 | = 11011011 | ==> | 001011011 or 110100100 | +/−1 |
| 220 or −36 | = 11011100 | ==> | 001010111 or 110101000 | +/−1 |
| 221 or −35 | = 11011101 | ==> | 000111110 or 111000001 | +/−1 |
| 222 or −34 | = 11011110 | ==> | 000111101 or 111000010 | +/−1 |
| 223 or −33 | = 11011111 | ==> | 000111011 or 111000100 | +/−1 |
| 224 or −32 | = 11100000 | ==> | 101101011 or 010010100 | +/−3 |
| 225 or −31 | = 11100001 | ==> | 101100111 or 010011000 | +/−3 |
| 226 or −30 | = 11100010 | ==> | 101011110 or 010100001 | +/−3 |
| 227 or −29 | = 11100011 | ==> | 101011101 or 010100010 | +/−3 |
| 228 or −28 | = 11100100 | ==> | 101011011 or 010100100 | +/−3 |
| 229 or −27 | = 11100101 | ==> | 101010111 or 010101000 | +/−3 |
| 230 or −26 | = 11100110 | ==> | 100111110 or 011000001 | +/−3 |
| 231 or −25 | = 11100111 | ==> | 100111101 or 011000010 | +/−3 |
| 232 or −24 | = 11101000 | ==> | 100111011 or 011000100 | +/−3 |
| 233 or −23 | = 11101001 | ==> | 100110111 or 011001000 | +/−3 |
| 234 or −22 | = 11101010 | ==> | 011111100 or 100000011 | +/−3 |
| 235 or −21 | = 11101011 | ==> | 011111010 or 100000101 | +/−3 |
| 236 or −20 | = 11101100 | ==> | 011111001 or 100000110 | +/−3 |
| 237 or −19 | = 11101101 | ==> | 011110110 or 100001001 | +/−3 |
| 238 or −18 | = 11101110 | ==> | 011110101 or 100001010 | +/−3 |
| 239 or −17 | = 11101111 | ==> | 011110011 or 100001100 | +/−3 |
| 240 or −16 | = 11110000 | ==> | 011101110 or 100010001 | +/−3 |
| 241 or −15 | = 11110001 | ==> | 011101101 or 100010010 | +/−3 |
| 242 or −14 | = 11110010 | ==> | 011101011 or 100010100 | +/−3 |
| 243 or −13 | = 11110011 | ==> | 011100111 or 100011000 | +/−3 |
| 244 or −12 | = 11110100 | ==> | 011011110 or 100100001 | +/−3 |
| 245 or −11 | = 11110101 | ==> | 011011101 or 100100010 | +/−3 |
| 246 or −10 | = 11110110 | ==> | 011011011 or 100100100 | +/−3 |
| 247 or −9 | = 11110111 | ==> | 011010111 or 100101000 | +/−3 |
| 248 or −8 | = 11111000 | ==> | 010111110 or 101000001 | +/−3 |
| 249 or −7 | = 11111001 | ==> | 010101101 or 101000010 | +/−3 |
| 250 or −6 | = 11111010 | ==> | 010111011 or 101000100 | +/−3 |
| 251 or −5 | = 11111011 | ==> | 010110111 or 101001000 | +/−3 |
| 252 or −4 | = 11111100 | ==> | 001111110 or 110000001 | +/−3 |
| 253 or −3 | = 11111101 | ==> | 001111101 or 110000010 | +/−3 |
| 254 or −2 | = 11111110 | ==> | 001111011 or 110000100 | +/−3 |
| 255 or −1 | = 11111111 | ==> | 001110111 or 110001000 | +/−3 |

What is claimed is:

1. A communications interface comprising:

a data interface in communication with a node interface port;

a receiver in communication with said data interface and a network data bus;

a transmitter in communication with said data interface and said network data bus;

said data interface receiving network data from the network data bus via said receiver according to a network data format and forwarding such network data to an external node via said node interface port according to a node data format compatible with such external node;

said data interface further receiving external data from said external node via said node interface port according to said node data format and providing such external data to said transmitter according to said network data format;

a controller in communication with said data interface, receiver and transmitter for determining said node data format, said controller having a memory storing configuration information about how to recognize and distinguish various types of network data that may be received by said receiver, when such network data should be received by said receiver, and when the network data bus is available for data transmission by said transmitter;

wherein said receiver detects a network data phase difference by comparing a phase of received network data to an expected phase based on said stored configuration information.

2. The communications interface of claim 1 wherein said receiver advances or delays transmission of received network data to said data interface based on the network phase difference detected by said receiver.

3. A communications interface comprising:
   a data interface in communication with a node interface port;
   a receiver in communication with said data interface and a network data bus;
   a transmitter in communication with said data interface and said network data bus, said transmitter including means for determining an estimate of a propagation delay associated with transmissions from said transmitter through said network data bus, and for adjusting signals transmitted by said transmitter to compensate for said estimated propagation delay, said estimate being determined bv measuring travel time for a signal traveling from said transmitter via said network data bus to said receiver;
   said data interface receiving network data from the network data bus via said receiver according to a network data format and forwarding such network to an external node via said node interface port according to a node data format compatible with such external node;
   said data interface further receiving external data from said external node via said node interface port according to said node data format and providing such external data to said transmitter according to said network data format.

4. The communications interface of claim 3 further comprising:
   a controller having a memory storing configuration information about how to recognize and distinguish various types of network data that may be received by said receiver; and
   wherein said receiver detects network data phase differences by comparing the phase of received network data with a phase expected based on said configuration information stored in said controller and advances or delays transmission of received network data to said data interface based on said detected network data phase differences.

5. A communications interface comprising:
   a data interface in communication with a node interface port;
   a receiver in communication with said data interface and a first transducer that receives light pulses from an optical fiber transmission line of an optical data bus, converts said received light pulses into digital data, and provides said digital data to said receiver;
   a transmitter in communication with said data interface and a second transducer that receives digital data from said transmitter, converts said digital data received from said transmitter into light pulses, and provides said light pulses to another optical fiber transmission line of said optical data bus, said transmitter including means for determining an estimate of a propagation delay associated with transmissions from said transmitter via said optical data bus by measuring the time it takes for a signal to travel from said transmitter via said optical data bus to said receiver, and for adiusting signals transmitted by said transmitter to compensate for the estimated propagation delay;
   said data interface receiving digital data from said receiver according to a network data format and providing data received from said receiver to an external node according to a node data format compatible with such external node;
   said data interface further receiving data from said external node according to said node data format and providing said data received from said external node to said transmitter according to said network data format; and
   a controller in communication with said data interface, receiver and transmitter;
   said controller containing predetermined node data formats and configures said data interface by providing it with control information associated with one of said predetermined node data formats that allows said data interface to provide data to said external node in one of said predetermined node data formats.

6. A data communications system comprising:
   a data communications network that transmits data according to a network data format;
   a plurality of nodes, any one of said plurality of nodes transmitting or receiving data according to a node data format used by said one of said plurality of nodes; and
   configurable communications interfaces in communication with said network and said plurality of nodes, said communications interfaces passing data from said nodes to said network or from said network to said nodes;
   each of said configurable communications interfaces capable of being configured to accept data from an associated node in the node data format of such associated node, transmit data to said network in said network data format, receive data from said network in said network data format, and transmit data to such associated node in the node data format of such associated node; and
   a master controller in communication with said network via one of said configurable communications interfaces for transmitting a synchronization symbol to the other of said configurable communications interfaces via the network in time slots assigned by said network data format, said synchronization symbol being used by such other configurable communications interfaces to adjust their frequency timing with respect to said master controller.

7. The system of claim 6 wherein said network data format further comprises:
   a start-of-transmission symbol transmitted at the beginning of each of said time slots, said interface using said start-of-transmission symbol to make phase adjustments to each interface's phase timing.

8. The system of claim 7 wherein:
   the data transmitted by least one of said plurality of nodes to an associated configurable communications interface comprises audio data; and
   said audio data is transmitted according to a node data format that is compatible with audio signals.

9. The system of claim 7 wherein:
   the data transmitted by least one of said plurality of nodes to an associated configurable communications interface comprises video data; and
   said video data is transmitted according to a node data format that is compatible with video signals.

10. A data communications system comprising:
    a data communications network that transmits data according to a network data format;

a plurality of nodes, any one of said plurality of nodes transmitting or receiving data according to a node data format used by one of said plurality of nodes; and configurable communications interfaces in communication with said network and said plurality of nodes, said communications interfaces passing data from said nodes to said network or from said network to said nodes, at least one of said configurable communications interfaces including a transmitter having means for determining an estimate of a propagation delay associated with transmissions from said transmitter via said network by measuring the time it takes for a signal to travel from said transmitter via said network back to said interface, and adjusting signals transmitted by said transmitter to compensate for the estimated propagation delay;

each of said configurable communications interfaces capable of being configured to accept data from an associated node in the node data format of such associated node, transmit data to said network in said network data format, receive data from said network in said network data format, and transmit data to such associated node in the node data format of such associated node.

11. A data communications system comprising:

a data communications network that transmits data according to a network data format;

a plurality of nodes, any one of said plurality of nodes transmitting or receiving data according to a node data format used by one of said plurality of nodes; and configurable communications interfaces in communication with said network and said plurality of nodes, said communications interfaces passing data from said nodes to said network or from said network to said nodes;

each of said configurable communications interfaces capable of being configured to accept data from an associated node in the node data format of such associated node, transmit data to said network in said network data format, receive data from said network in said network data format, and transmit data to such associated node in the node data format of such associated node, wherein each of said configurable communications interfaces interrogates said associated node to determine whether such associated node is capable of receiving information about when the network is available for transmission of data, when information on the network should be received and passed to such associated node, and various types of data that may be received from the network, and for providing such information to the associated node if it is determined that the associated node is capable of receiving such information;

wherein one of said plurality of nodes comprises a master controller in communication with said network via one of said configurable communications interfaces for transmitting a synchronization symbol via the network to the other of said configurable communications interfaces, said synchronization symbol being used by such other configurable communications interfaces to synchronize a local clock of each of such interfaces to said master controller.

12. A data communications system comprising:

a data communications network that transmits data according to a network data format;

a plurality of nodes, any one of said plurality of nodes transmitting or receiving data according to a node data format used by one of said plurality of nodes; and configurable communications interfaces in communication with said network and said plurality of nodes, said communications interfaces passing data from said nodes to said network or from said network to said nodes;

each of said configurable communications interfaces capable of being configured to accept data from an associated node in the node data format of such associated node, transmit data to said network in said network data format, receive data from said network in said network data format, and transmit data to such associated node in the node data format of such associated node; and a master controller in communication with said network via one of said configurable communications interfaces; and wherein said one configurable communications interface:
receives clock frequency recovery communications from said master controller, and uses said clock frequency recovery communications to generate its frequency timing relative to said master controller;
receives clock phase recovery communications and uses the clock phase recovery communication to generate its phase timing relative to a reference point on said network; and
enables data reception only after the frequency timing and phase timing have been generated.

13. The system of claim 12 wherein said clock phase recovery communications comprise a start-of-transmission symbol comprising:

a guard interval;

a phase alignment marker having a predetermined pattern known to said one configurable communications interface;

said guard interval used by said one configurable communications interface to allow a time marker for detecting said phase alignment marker.

14. The system of claim 13 wherein:

said phase alignment marker in said phase recovery communication is compared to said known pattern; and said phase timing is adjusted based on said comparison.

15. The system of claim 12 wherein said one configurable communications interface includes a transmitter, and has an estimate of a propagation delay associated with transmissions from said transmitter, and adjusts signals transmitted by said transmitter to compensate for said estimated propagation delay.

16. The system of claim 15 wherein said one configurable communications interface determines said estimate of said propagation delay.

17. The system of claim 16 wherein said one configurable communications interface determines said estimate by measuring the time it takes for a signal to travel from said transmitter via said network back to said one configurable communications interface.

18. A data communications system comprising:

a data communications network that transmits data according to a network data format;

a plurality of nodes, any one of said plurality of nodes transmitting or receiving data according to a node data format used by one of said plurality of nodes; and configurable communications interfaces in communication with said network and said plurality of nodes, said communications interfaces passing data from said nodes to said network or from said network to said nodes, and including a transmitter having means for determining an estimate of a propagation delay associated with transmissions from said transmitter via said network by measuring the time it takes for a signal to travel from said transmitter via said network back to said interface, and advancing data sent from said transmitter so that said data is out of phase with a local clock of said one configurable communications interface when sent, but substantially in phase with said local clock when said data is received back at said one configurable communications interface, thereby compensating for the estimated propagation delay;

each of said configurable communications interfaces capable of being configured to accept data from an associated node in the node data format of such associated node, transmit data to said network in said network data format, receive data from said network in said network data format, and transmit data to such associated node in the node data format of such associated node.

19. The system of claim 12 wherein said clock frequency recovery communications comprise a synchronization pattern which is fed to a voltage controlled oscillator to generate frequency timing.

* * * * *